US011205036B2

(12) United States Patent
Horton et al.

(10) Patent No.: US 11,205,036 B2
(45) Date of Patent: Dec. 21, 2021

(54) METHOD AND SYSTEM FOR IMPLEMENTING CONTEXTUAL WIDGETS

(71) Applicant: Oracle International Corporation, Redwood Shores, CA (US)

(72) Inventors: Noah Horton, San Francisco, CA (US); Salman Rafat Ansari, New York, NY (US); Joshua James Ellithorpe, San Francisco, CA (US); Damandip Singh Sanghera, Fresno, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 243 days.

(21) Appl. No.: 13/794,464

(22) Filed: Mar. 11, 2013

(65) Prior Publication Data
US 2014/0258837 A1 Sep. 11, 2014

(51) Int. Cl.
*G06F 40/106* (2020.01)
*G06F 3/0486* (2013.01)
*G06F 16/958* (2019.01)

(52) U.S. Cl.
CPC .......... *G06F 40/106* (2020.01); *G06F 3/0486* (2013.01); *G06F 16/958* (2019.01)

(58) Field of Classification Search
CPC .... G06F 17/2247; G06F 17/24; G06F 17/211; G06F 40/106; G06F 3/0486; G06F 16/958
USPC .......................................................... 715/234
See application file for complete search history.

(56) References Cited

U.S. PATENT DOCUMENTS

| 5,913,063 | A | 6/1999 | McGurrin et al. |
| 5,956,736 | A * | 9/1999 | Hanson ................... G06F 17/21 715/234 |
| 6,597,377 | B1 | 7/2003 | MacPhail |
| 6,654,947 | B1 | 11/2003 | North et al. |
| 6,668,354 | B1 | 12/2003 | Chen et al. |
| 7,030,890 | B1 * | 4/2006 | Jouet ..................... G06F 9/4443 345/589 |
| 7,337,392 | B2 | 2/2008 | Luc |
| 7,757,210 | B1 | 7/2010 | Krueger |
| 7,890,639 | B1 * | 2/2011 | Holmstead .......... G06F 21/6218 709/229 |
| 7,945,863 | B1 | 5/2011 | Reid et al. |
| 8,196,112 | B1 * | 6/2012 | Cansizlar ............ G06F 11/3672 717/116 |
| 8,352,966 | B2 | 1/2013 | Clayton |
| 8,413,055 | B2 | 4/2013 | Yuen et al. |
| 8,438,495 | B1 | 5/2013 | Gilra et al. |

(Continued)

OTHER PUBLICATIONS

Non-final Office Action dated Mar. 25, 2015 for U.S. Appl. No. 13/794,406.

(Continued)

*Primary Examiner* — Thu V Huynh
(74) *Attorney, Agent, or Firm* — Invoke

(57) ABSTRACT

An improved approach is described to implement a new type of widget that obtains its context information from another widget. For example, when a contextual widget is dropped into a drop zone, that contextual widget would obtain its context data from its parent drop zone widget. Also described is an improved for visually implementing a web page layout, where the web page layout includes a nested drop zone.

18 Claims, 26 Drawing Sheets

(56) References Cited

U.S. PATENT DOCUMENTS

| | | |
|---|---|---|
| 8,667,415 B2 | 3/2014 | Rudolph et al. |
| 8,719,896 B2 | 5/2014 | Poulsen et al. |
| 9,032,312 B2 | 5/2015 | Barnes et al. |
| 9,063,740 B2 | 6/2015 | Poulsen et al. |
| 9,324,098 B1 * | 4/2016 | Agrawal ................. G06Q 20/02 |
| 9,524,273 B2 | 12/2016 | Horton et al. |
| 2002/0023111 A1 | 2/2002 | Arora et al. |
| 2003/0188004 A1 * | 10/2003 | Fairweather ............ G06F 8/427 709/231 |
| 2004/0039934 A1 * | 2/2004 | Land .................... G11B 27/034 726/26 |
| 2004/0046789 A1 | 3/2004 | Inanoria |
| 2004/0143822 A1 | 7/2004 | Jager et al. |
| 2005/0060277 A1 | 3/2005 | Zlatanov et al. |
| 2005/0086587 A1 * | 4/2005 | Balz ...................... G06Q 30/02 715/221 |
| 2005/0251380 A1 | 11/2005 | Calvert et al. |
| 2005/0273705 A1 | 12/2005 | McCain |
| 2006/0190844 A1 | 8/2006 | Binder et al. |
| 2006/0277585 A1 * | 12/2006 | Error ..................... G06Q 30/02 725/112 |
| 2007/0038934 A1 * | 2/2007 | Fellman ........................ 715/700 |
| 2007/0079282 A1 * | 4/2007 | Nachnani ................. G06F 8/34 717/106 |
| 2007/0101297 A1 * | 5/2007 | Forstall ................ G06F 3/0482 715/841 |
| 2007/0234223 A1 | 10/2007 | Leavitt et al. |
| 2007/0250784 A1 * | 10/2007 | Riley .................... G06Q 10/10 715/764 |
| 2007/0299857 A1 * | 12/2007 | Gwozdz ............... G06F 16/957 |
| 2008/0052140 A1 * | 2/2008 | Neal ..................... G06Q 30/02 705/1.1 |
| 2008/0104496 A1 * | 5/2008 | Williams ............. G06Q 10/107 715/209 |
| 2008/0120538 A1 | 5/2008 | Kurz et al. |
| 2008/0195483 A1 | 8/2008 | Moore |
| 2009/0013244 A1 * | 1/2009 | Cudich ................... G06F 40/14 715/234 |
| 2009/0158139 A1 | 6/2009 | Morris et al. |
| 2009/0192849 A1 | 7/2009 | Hughes et al. |
| 2009/0225038 A1 | 9/2009 | Bolsinga et al. |
| 2010/0031147 A1 * | 2/2010 | Williams .......... G06F 17/30017 715/716 |
| 2010/0037168 A1 | 2/2010 | Thayne et al. |
| 2010/0262477 A1 * | 10/2010 | Hillerbrand et al. ...... 705/14.16 |
| 2011/0035692 A1 * | 2/2011 | Sandone et al. .............. 715/769 |
| 2011/0191702 A1 | 8/2011 | Lunsford |
| 2011/0214078 A1 * | 9/2011 | Klask et al. ................... 715/763 |
| 2011/0314373 A1 * | 12/2011 | Prophete et al. ............. 715/273 |
| 2012/0137227 A1 | 5/2012 | Gerken, III |
| 2012/0144327 A1 | 6/2012 | Johnson |
| 2012/0233312 A1 | 9/2012 | Ramakumar et al. |
| 2013/0132868 A1 | 5/2013 | Hackett et al. |
| 2013/0132875 A1 | 5/2013 | Allen et al. |
| 2014/0245451 A1 | 8/2014 | Le Sant |
| 2014/0258869 A1 | 9/2014 | Thomas et al. |
| 2015/0012818 A1 * | 1/2015 | Reichmann .......... G06F 40/166 715/236 |

OTHER PUBLICATIONS

Final Office Action dated Aug. 26, 2015 for U.S. Appl. No. 13/794,406.

Non-final Office Action dated Feb. 16, 2016 for related U.S. Appl. No. 13/794,406.

Notice of Allowance and Fee(s) due dated Jul. 20, 2016 for related U.S. Appl. No. 13/794,406.

Supplemental Notice of Allowance dated Aug. 11, 2016 for related U.S. Appl. No. 13/794,406.

* cited by examiner

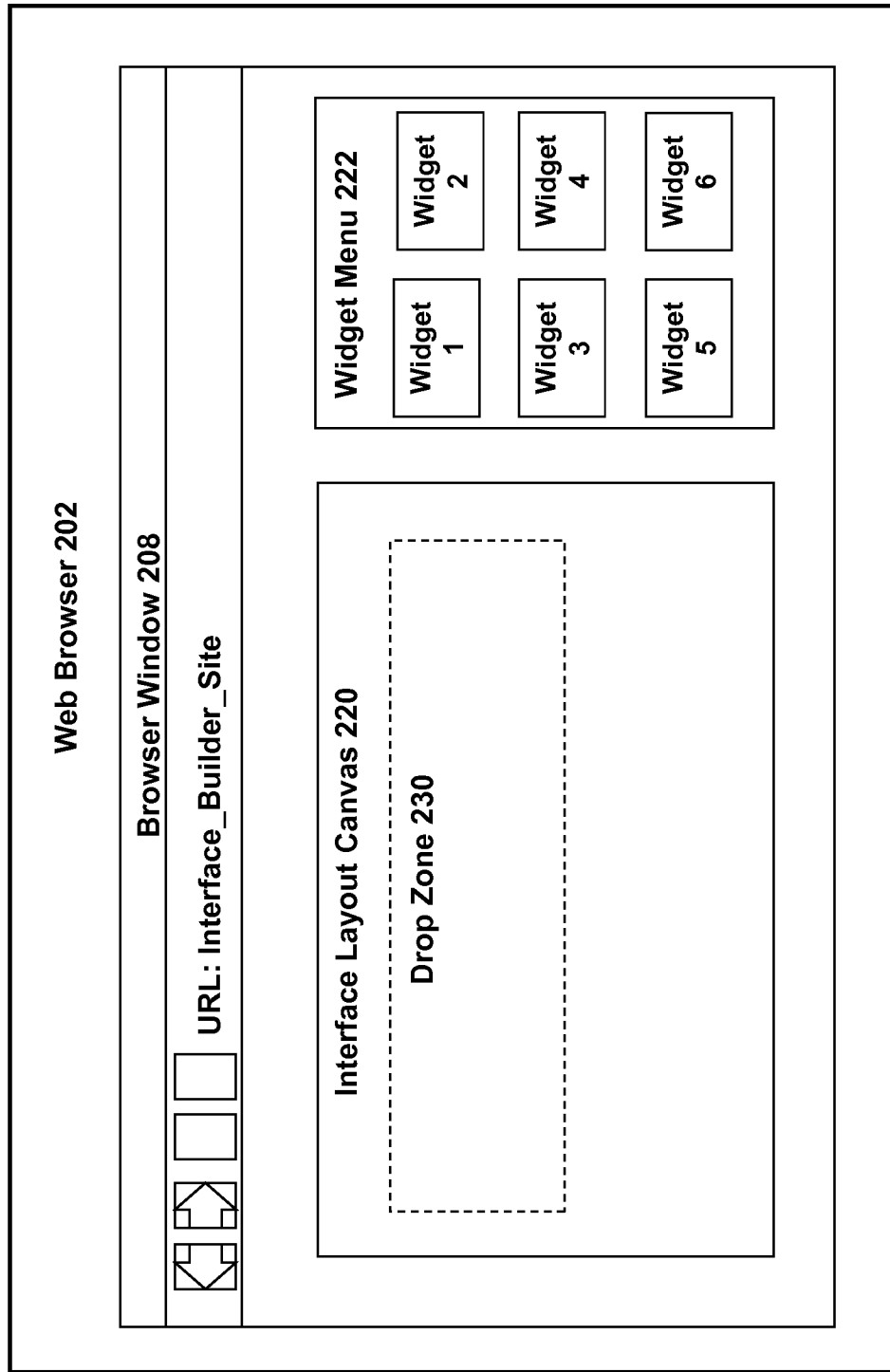

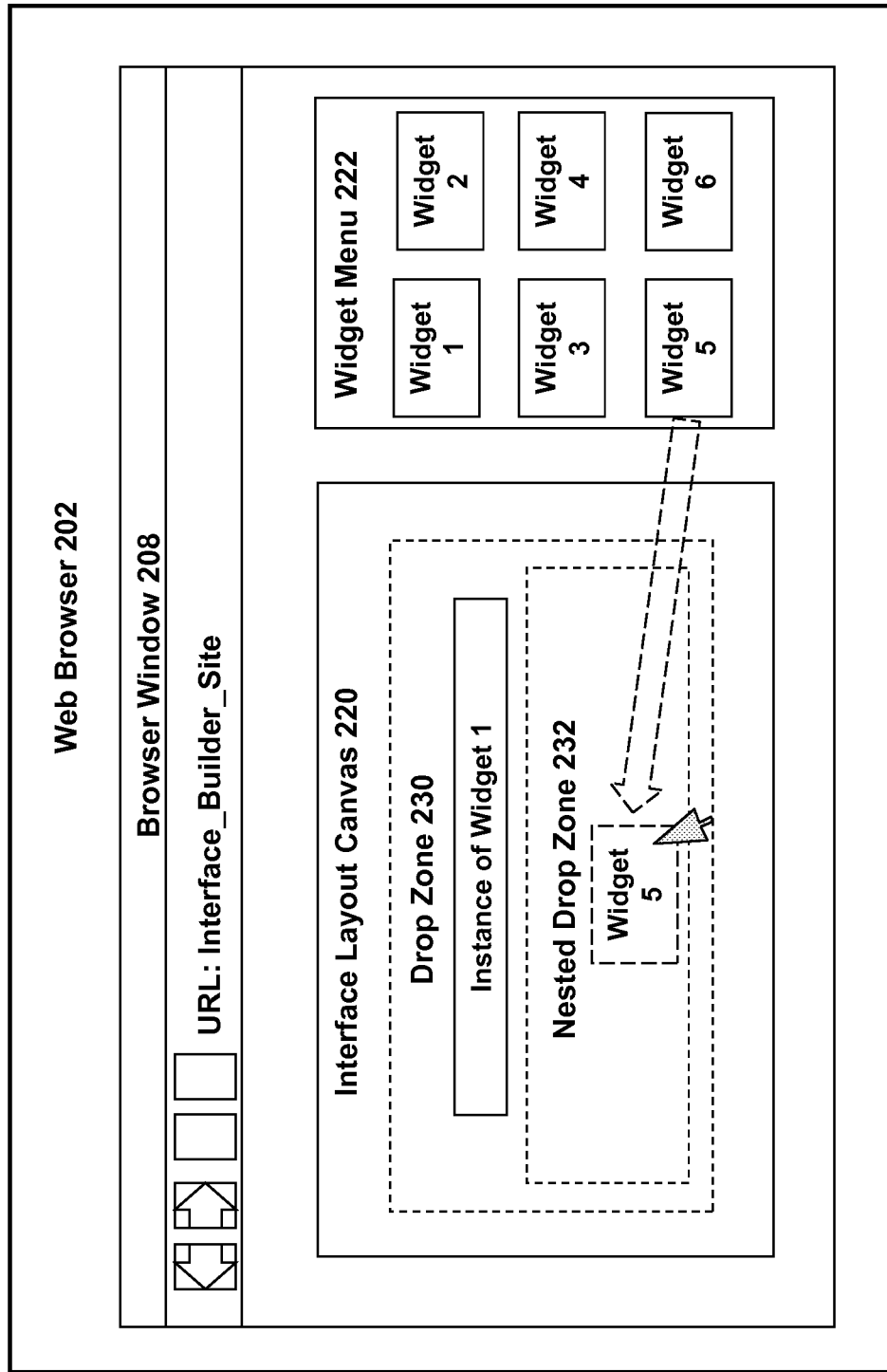

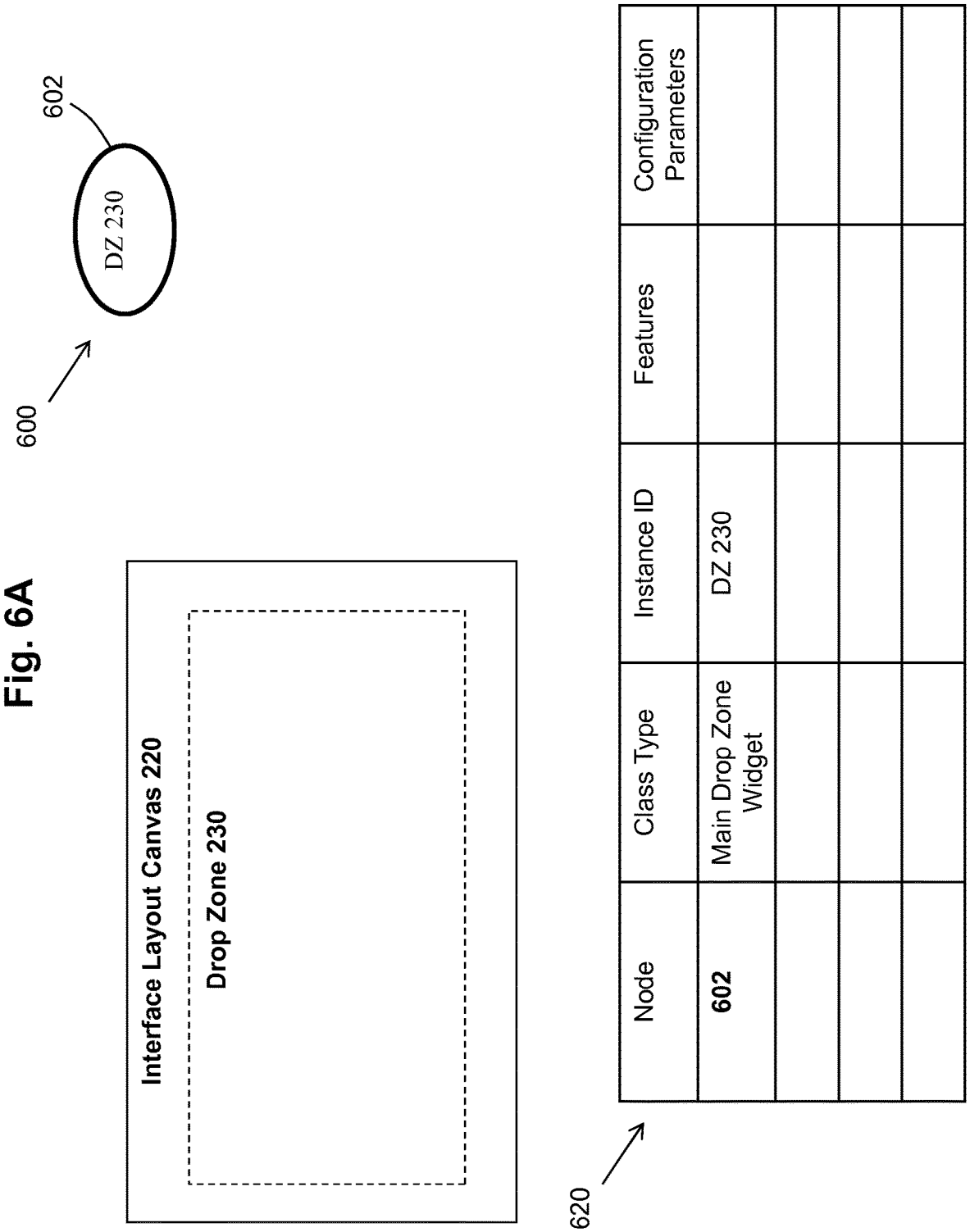

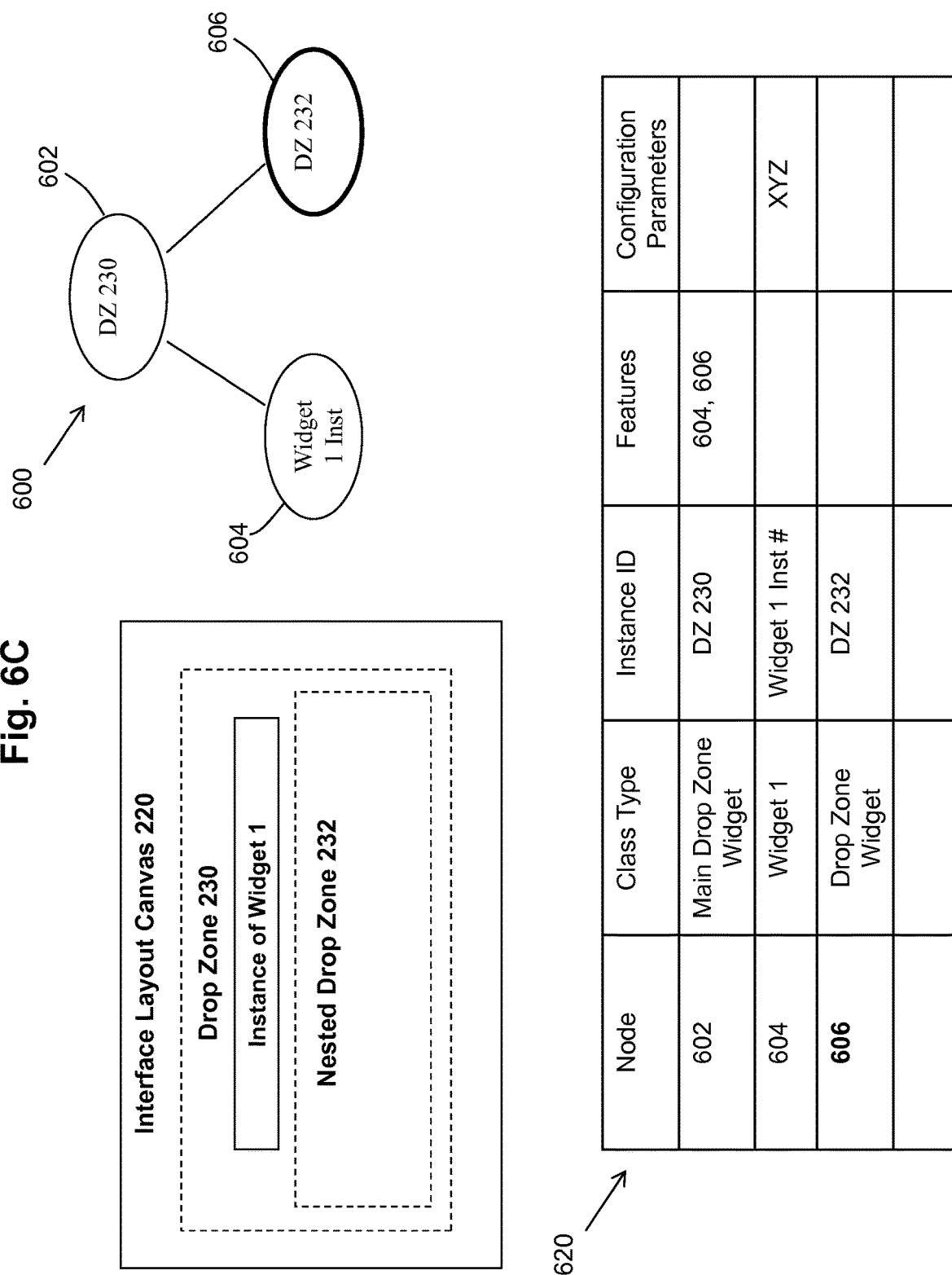

Fig. 9

----WIDGET PROVIDING CONTEXT----
{% rss_feed name:"recent_deals" %}
{% for story in rss_feed.feed_stories limit:5 %}
<p>
<h2>{{story.title}}</h2>
<a href={{story.url}}>Read Full Story</a>
    {% drop_zone id:1 feature_id: feature_id
content_context: story %}{% enddrop_zone %}
</p>
{% endfor %}
{% endrss_feed %}

902

904

906

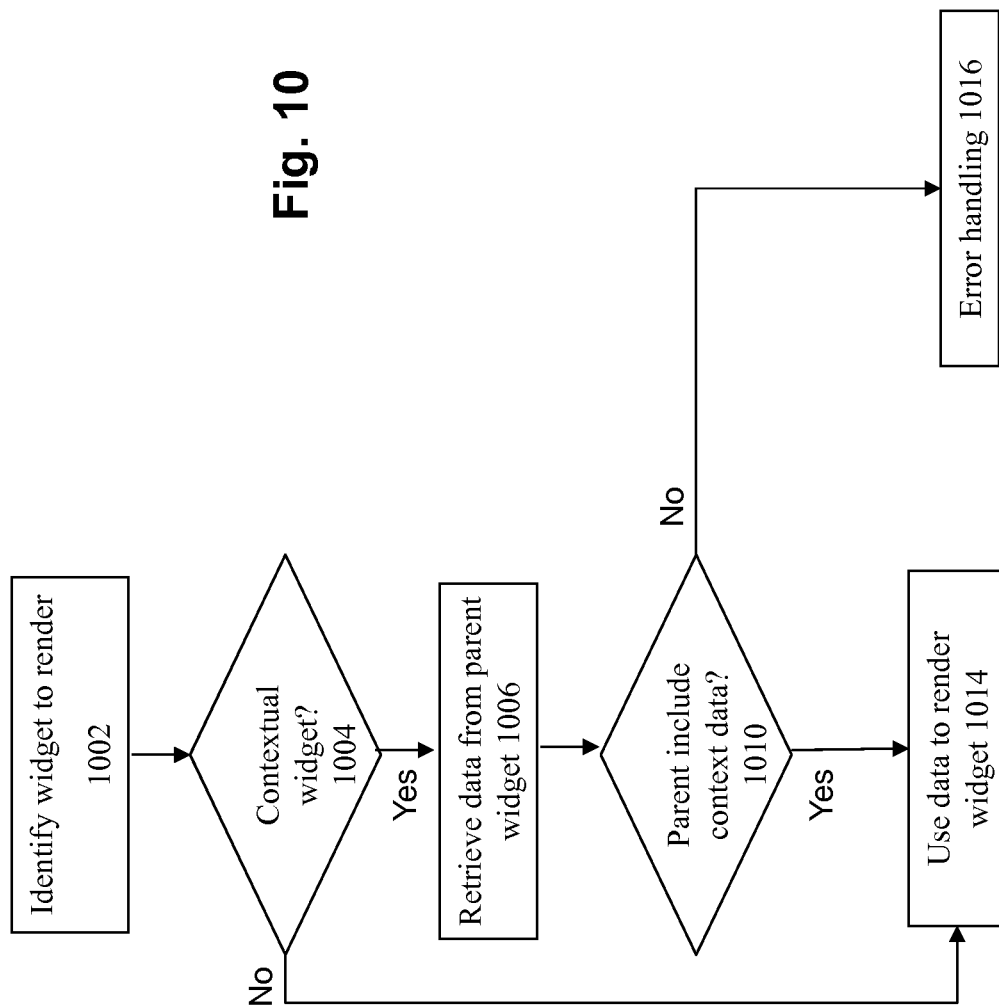

---THIS IS A LIKE WIDGET UNDER HERE THAT RECEIVES AND USES CONTEXT---
{% if parent_drop_zone.content_context == NULL%}BLOW UP!!!!!{%endif%}  ← 1104
<fb:like url="current_url"
{% if parent_drop_zone.content_context.image != NULL
%}image="{{parent_drop_zone.content_context.image}}"{endif}
{% if parent_drop_zone.content_context.video != NULL
%}image="{{parent_drop_zone.content_context.video}}"{endif}
{% if parent_drop_zone.content_context.description != NULL
%}image="{{parent_drop_zone.content_context.description}}"{endif}
/>

} 1106

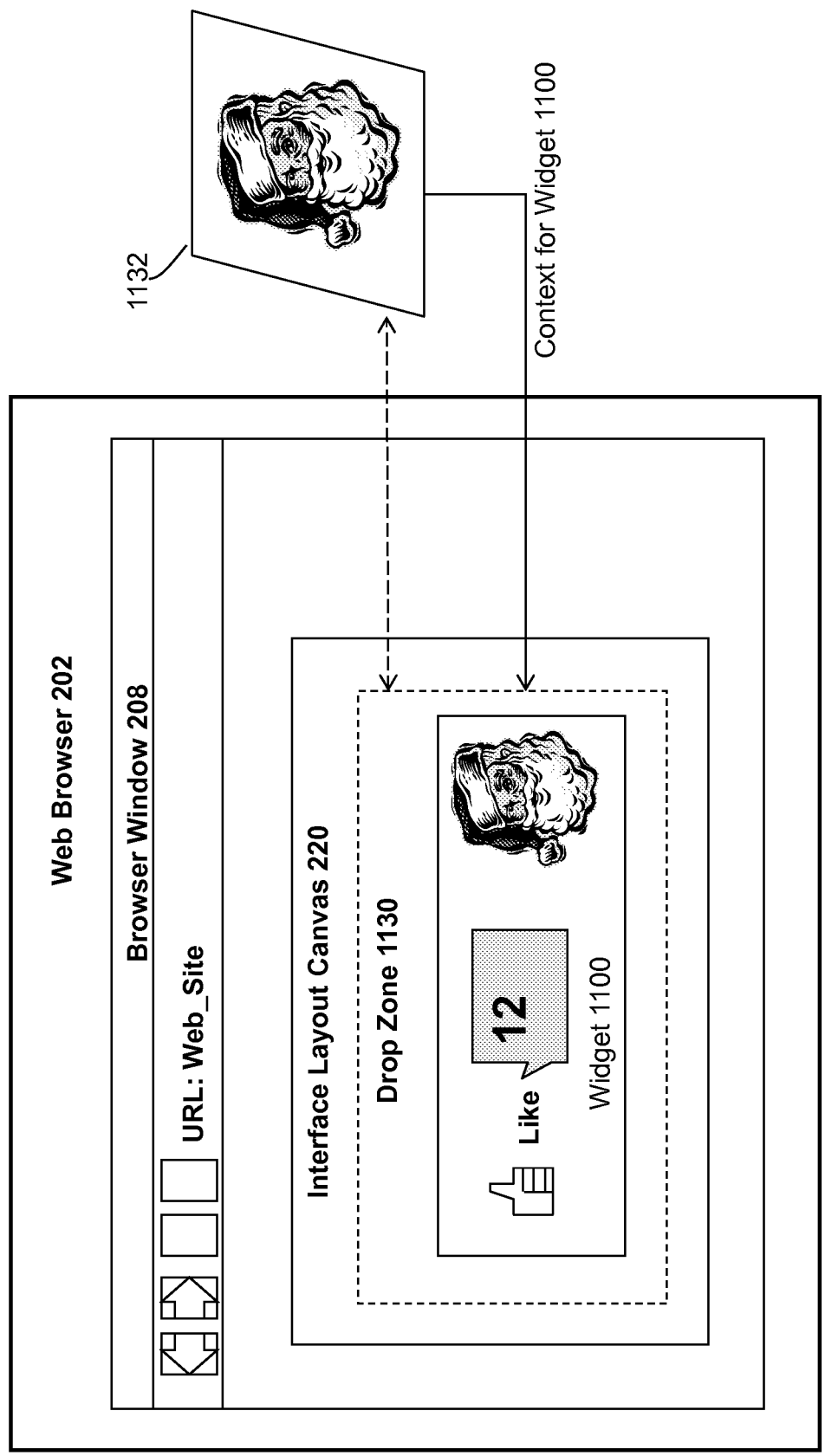

METHOD AND SYSTEM FOR IMPLEMENTING CONTEXTUAL WIDGETS

RELATED APPLICATIONS

The present application is related to U.S. patent application Ser. No. 13/794,406, entitled "METHOD AND SYSTEM FOR IMPLEMENTING NESTED DROP ZONES" filed on Mar. 11, 2013, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Users typically interact with the internet through World Wide Web (WWW) pages which offer hypertext capabilities. Hyper Text Markup Language (HTML) is a scripting or programming language which enables the content providers or developers of web pages to place hyperlinks within the pages, which then link to related content or data present in other web pages. The content or data present in each web page can be navigated by the end users using a Graphical User Interface (GUI).

For example, consider the typical web page displayed on a social media site. Such social sites include, for example, websites such as a social network, blog or web feed (e.g., Facebook, Twitter, Blogger, and RSS). The content on a typical social media web page is usually presented through a browser interface, and may include numerous kinds of data content such as images and associated metadata, text, rich media, and/or URLs directly at the site or linked from one or more other sources. In addition, the social media web page may also contain embedded applications or functional content (referred to herein collectively as "widgets") placed at designated locations on the page.

There are many ways to construct web pages. In many cases, a specialized programmer, or a team of such programmers, is required to manually write the computer code for the web page. Depending on the exact functionality desired for the web page, it is possible that the programmer(s) will need to be experienced with numerous different programming languages. As is evident, this code-based programmatic approach has limited usefulness to non-programmers or to programmers who are not experienced with the specific languages needed for web programming.

Interactive web building tools are also available. These tools employ a visual interface with drag and drop capability which permits non-specialist programmers to construct web pages. However, conventional web building tools for constructing web pages are often limited in their capabilities, where only the functionality included within the tools can be implemented onto the web pages. Thus, if specialized functionality or configuration of the web page format is needed, the web page designer may still need to engage an expert programmer to write code to implement the web page. For example, many web pages designed for social media sites will need dedicated layout configurations and functional content to the address specialized social media needs, where these specialized layouts and functional content are not provided by conventional builder tools.

Given the widespread availability and usage of the internet, and the increasing usage of social media sites in particular, it is imperative for many businesses, organizations, and individuals to be able to effectively and efficiently produce web pages to be provided on those sites.

Therefore, there is a need for an improved approach to implement web pages. The improved approach should allow one to design and implement a specialized configuration for a web page layout, without requiring expert programmers to write computer code for the layout. In addition, the improved approach should permit the user to implement functional content on the web page.

SUMMARY

According to some embodiments of the invention, disclosed is an improved approach to implement a new type of widget that obtains its context information from another widget. For example, when a contextual widget is dropped into a drop zone, that contextual widget would obtain its context data from its parent drop zone widget. The drop zone is a location on the web page layout that permits drag and drop capability to insert functional content.

In addition, disclosed is an approach for visually implementing a web page and/or interface layout, where the layout includes a nested drop zone. The functional content may include a drop zone, permitting additional functional content to be placed (or "nested") into that drop zone.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIGS. 2A-G provide an illustrative example for using an interactive builder application to construct a page layout having a nested drop zone.

FIGS. 6A-D provide an illustrative example of using a tree data structure to construct a page layout having a nested drop zone.

FIG. 9 provides an illustrative example of pseudo code for a widget that provides content to a contextual widget.

FIG. 10 shows a flowchart of an approach to implement a contextual widget.

FIG. 11 provides an illustrative example of pseudo code for a contextual widget.

FIG. 12 provides an illustrative example of a contextual widget.

DETAILED DESCRIPTION

The present disclosure is directed to an approach for visually implementing a page and/or interface layout, where the layout includes a nested drop zone. The drop zone is a location on the layout that permits drag and drop capability to insert functional content. The functional content may itself be or include a drop zone, permitting additional functional content to be placed (or "nested") into that drop zone.

This provides numerous improvements over the prior approaches for implementing web pages/interfaces. The embodiments of the present invention allow a user to visually design and implement a specialized configuration for a web page layout, without requiring the need for expert programmers to write computer code for configuring the layout. In addition, the invention permits functional content to be placed in any custom way as desired on the web page.

Embodiments of the invention are described below in the context of building a page/interface for a social media application. However, it is noted that the invention is applicable to other types of applications as well. Therefore, the specific examples of social media pages, interfaces, and widgets described herein are illustrative only, and not limiting unless claimed as such.

Figure 1:
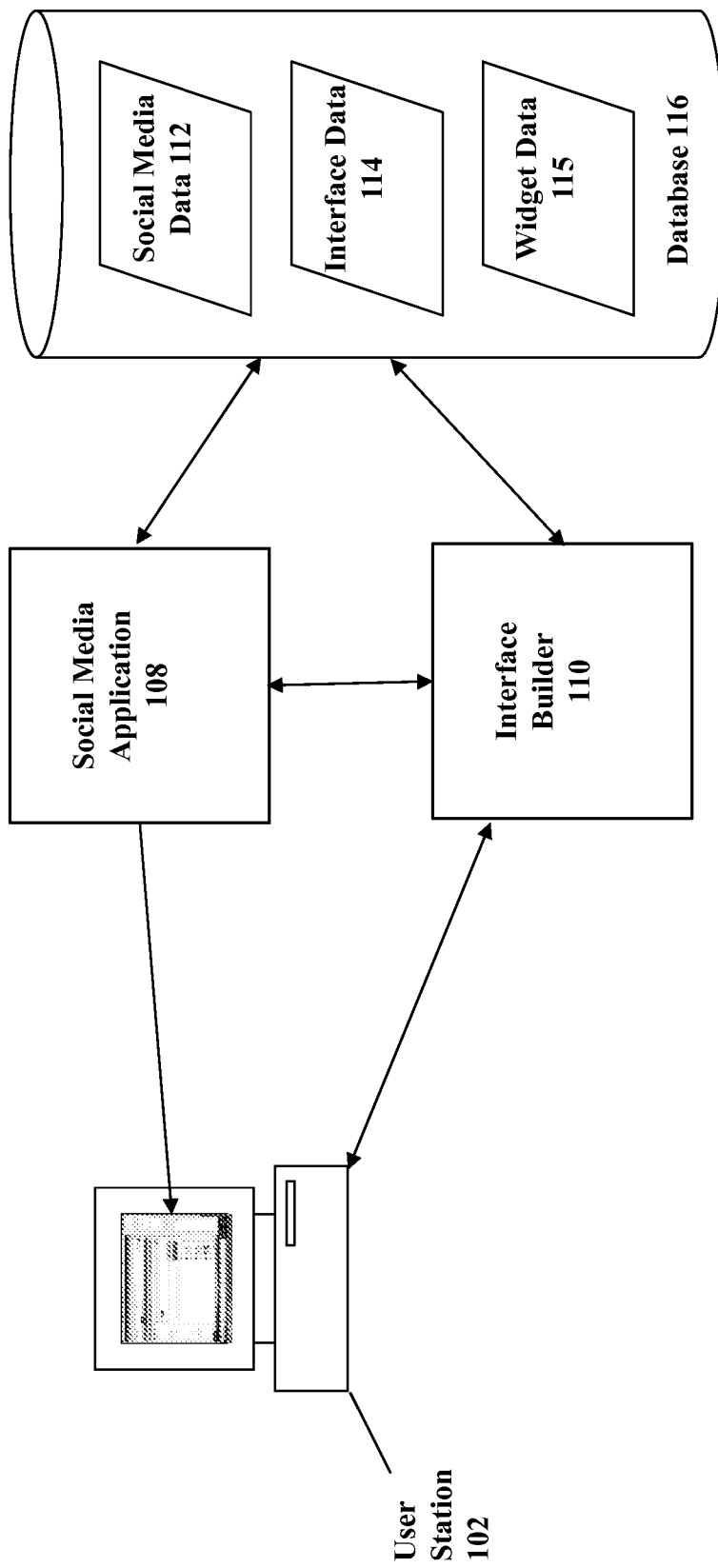
FIG. 1 illustrates a system for using an interactive builder to construct a page layout.

FIG. 1 illustrates an example system which may be employed in some embodiments of the invention to visually implement web pages having nested drop zones. The system includes one or more users at one or more user stations 102 that operate the system. The user station 102 comprises any type of computing station that may be used to operate or interface with the system. Examples of such user stations 102 include, for example, workstations, personal computers, or remote computing terminals. The user station 102 comprises a display device, such as a display monitor, for displaying a user interface to users. The user station 102 also comprises one or more input devices for the user to provide operational control over the activities of the system, such as a mouse or keyboard to manipulate a pointing object in a graphical user interface to generate user inputs to the social media application 108 and/or interface builder tool 110.

The interface builder tool 110 provides a framework for interactively implementing web pages to be used and/or displayed by a social media application 108. The web pages constructed by the builder tool 110 can be used to display data 112 from any suitable source. Such social data sources include, for example, websites such as a social network or blog or web feed (e.g., Facebook, Twitter, Blogger, and RSS). The content may include one or more comments (e.g., Facebook comment, comment to a blog post, reply to a previous comment) or uploaded postings (e.g., images and associated metadata, text, rich media, URLs) at one or more sources. The social data/content may therefore comprise a variety of forms and/or types. The web page may also include one or more items of functional content/widgets.

The interface builder tool 110 provides a user interface having a canvas for configuring the layout of a web page. A plurality of widget options are presented to the user. These widget options correspond to widget data 115 stored at database 116. Input can be received from one or more users at the user station 102 to drag and drop widget options onto the canvas.

The widgets are dropped onto drop zones in the layout canvas. The drop zone is a location on the interface layout that permits drag and drop capability to insert a widget. Certain of the widgets may also include its own drop zone, permitting additional one or more widgets to be placed (or "nested") into that drop zone. This process generates interface configuration data 114 that includes nested drop zones of widgets.

The data within the system can be stored into a database 116 in a computer readable storage device. The computer readable storage device comprises any combination of hardware and software that allows for ready access to the data that is located at the computer readable storage device. For example, the computer readable storage device could be implemented as computer memory operatively managed by an operating system. The computer readable storage device could also be implemented as an electronic database system having storage on persistent and/or non-persistent storage.

According to some embodiments, integration is provided between the social media application and an enterprise application. This facilitates commercial applications for the social media site. The enterprise application comprises any business-related application that provides visibility and control over various aspects of a business. Such enterprise/business applications can include, without limitation, customer relations management ("CRM") applications, enterprise resource planning ("ERP") applications, supply chain management applications, and other applications dealing with various finance, accounting, manufacturing, human resources, and/or distribution functions, to name but a few examples. Exemplary enterprise application suites include, without limitation, Oracle Fusion, Oracle eBusiness Suite and JD Edwards Enterprise One, all of which are available from Oracle Corporation of Redwood Shores, Calif.

FIGS. 2A-2G provide an illustrative example for visually using a builder tool to interactively design the layout of a web page. A web browser 202 can be used to display the builder interface on a web page window 208 (or tab within a web page).

The builder interface includes an interface layout canvas 220 that is displayed within the window 208. The interface layout canvas 220 corresponds to the location at which the web page is visually configured. As such, the layout of the final web page product is configured by manipulating the objects that appear within the interface layout canvas 220. The drop zone 230 is the object/widget within the interface layout canvas 220 that provides locations into which other objects can be dragged and dropped to configure the web page layout.

A widget menu 222 is provided to display a list of widgets (e.g., widgets 1-6) that a user can drag and drop into the drop zone 230. Each widget corresponds to a set of content that provides functionality that can be optionally implemented within a web page. The widget menu 222 corresponds to a library of such widgets, where the library comprises executable code for the widgets in the widget menu 222.

Any suitable type of widget/functional content may be provided in the widget menu 222. In some embodiments, the specific selection of widgets is provided to correspond to the intended purpose of the web page products. For example, where the builder is intended to construct web pages for social media platforms, the selection of widgets corresponds to functional content to facilitate operation with social media content/functionality. Other possible widget selection groupings may also be provided. For example for web pages intended to be used for an enterprise application, the widget options may include functional content related to the enterprise applications, such as CRM functionality or content.

A nonexclusive list of widget content includes, for example, social media applications, utility applications, news applications, and/or productivity applications. Social media applications include any functional content that operate with or connect with social media websites and applications, such as applications that interact with Twitter, Facebook, Yelp, and LinkedIn, e.g., a Facebook "Like" widget. Utility applications provide functional content to perform any desired functionality, such as a video display or an image display widget. News applications include functional content to provide news retrieval and display, e.g., an application to provide a RSS feed. Productivity applications include any application having useful functionality to increase the productivity of the system, enterprise, or other application. Examples of such applications include forms input widgets, survey widgets, coupon widgets, shopping widgets, advertising widgets, and widgets to interface with enterprise applications.

Figure 2B:
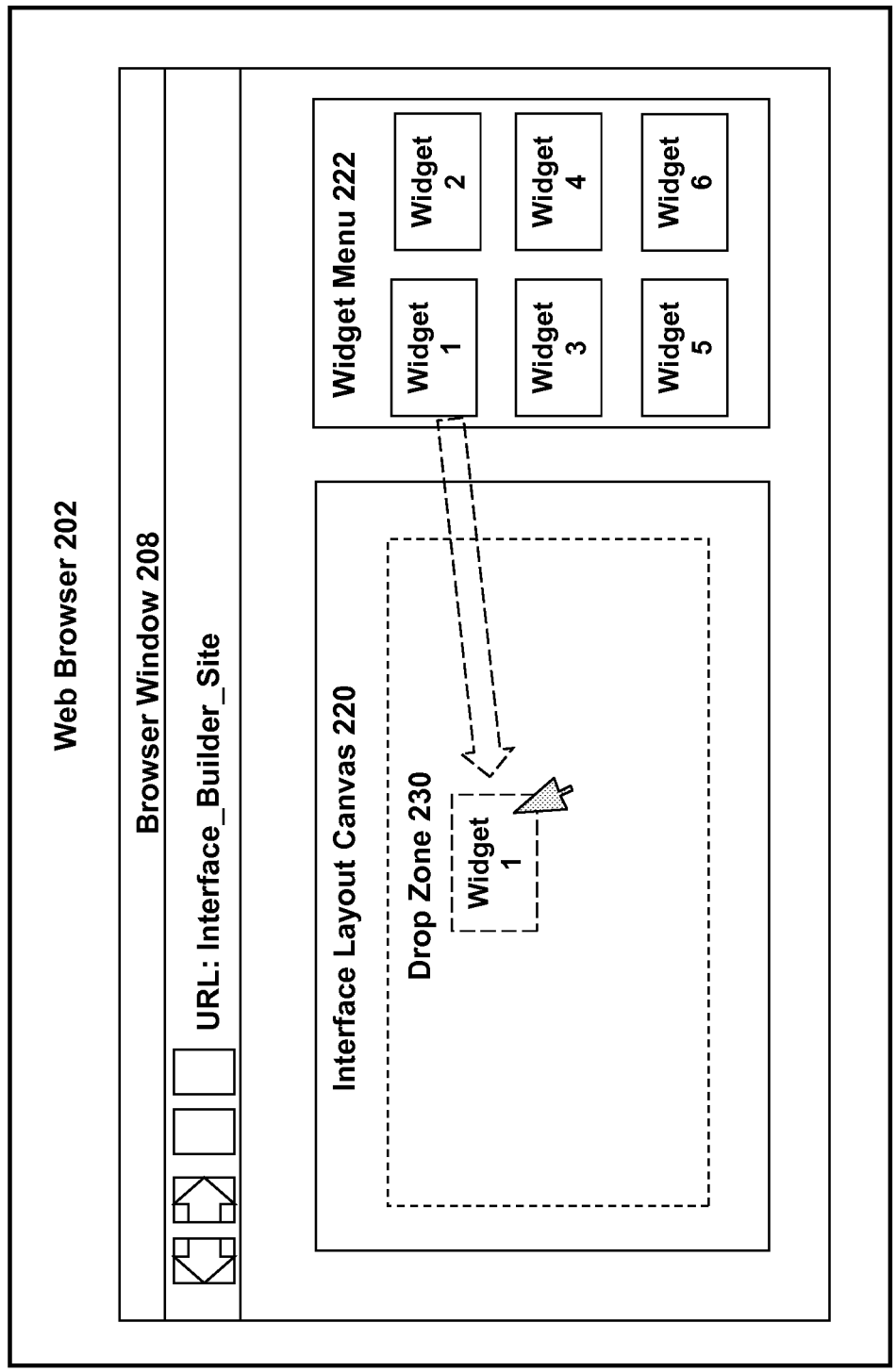
Figure 2C:
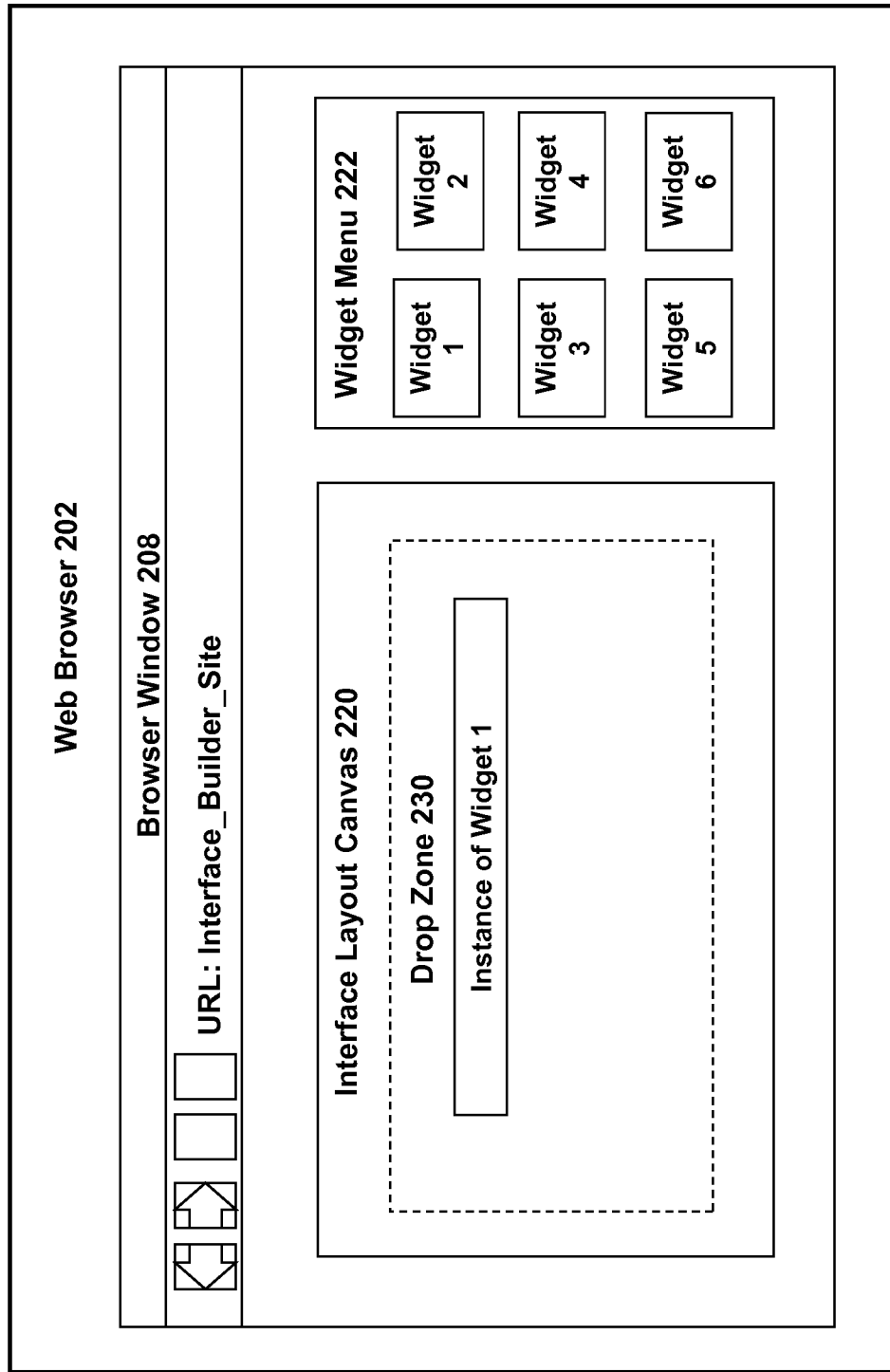

FIG. 2B illustrates how a widget option from the widget menu 222 can be dropped into the drop zone 230. In this case, widget 1 is selected for insertion into the web page layout. As a result, the icon for widget 1 is selected in the user interface from menu 222, dragged from the menu 222, and dropped into the drop zone 230. As shown in FIG. 2C, this results in an instance of widget 1 now appearing within the interface layout canvas 220 at the location within the drop zone 230 at which it was dropped.

The inserted widget can be configured to adjust any appropriate configuration settings as desired by the user for the widget. For example, assume that the widget has functionality for displaying an image. Once the image display widget has been dropped into the drop zone, the widget can be configured to identify the image to be displayed, e.g., by providing an URL or other storage location for the image.

According to embodiments of the invention, widgets can be implemented that provides drop zone functionality— where the object being dropped into a drop zone is a widget that itself has a drop zone. This provides for the idea of nested drop zones, so that each level of inserted widgets can spawn additional levels of insertable widgets of their own. The concept of nested drop zones permits an almost limitless amount of flexibility and possibilities for configuring the web page layout.

Figure 2D:
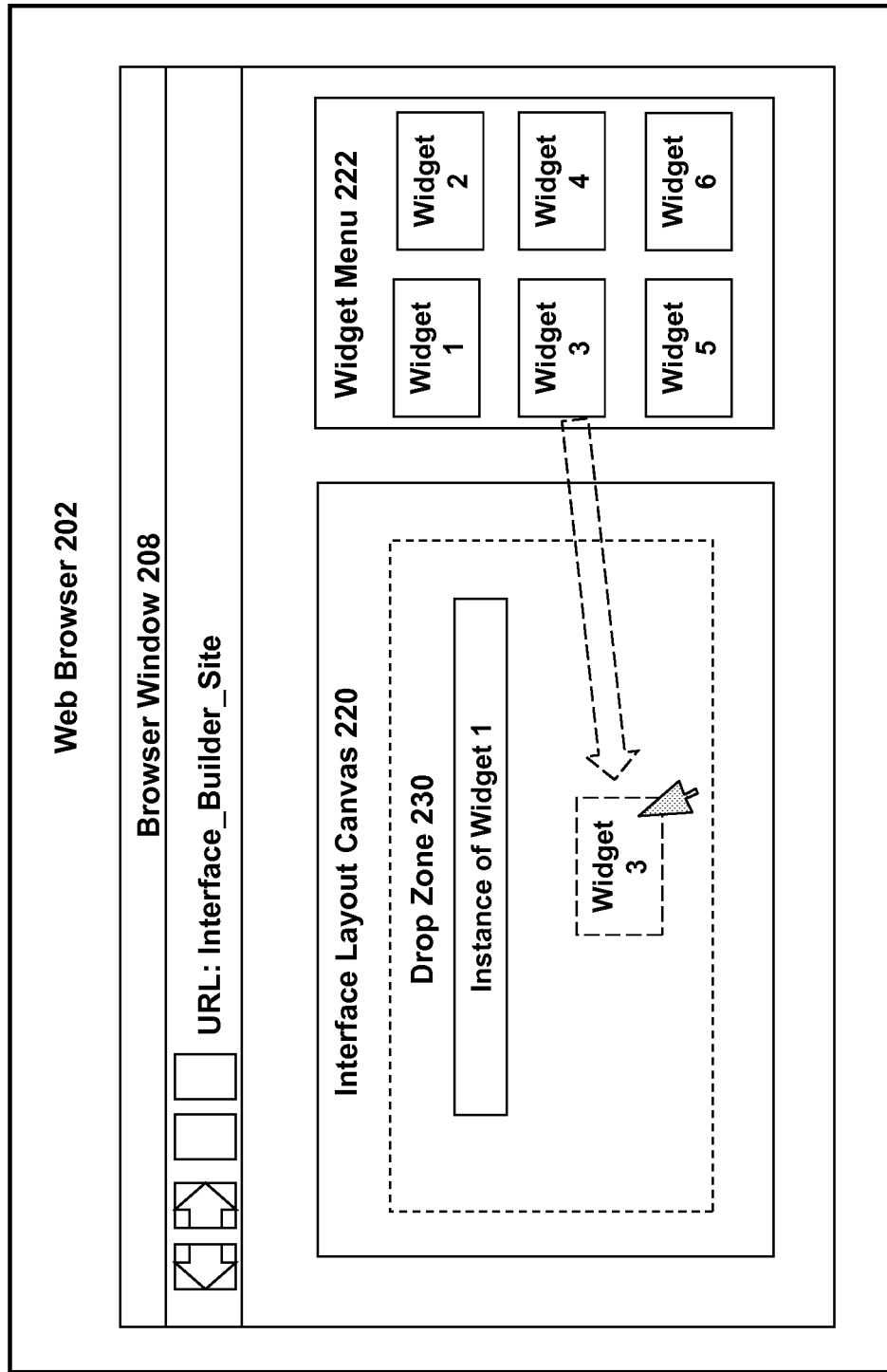
Figure 2E:
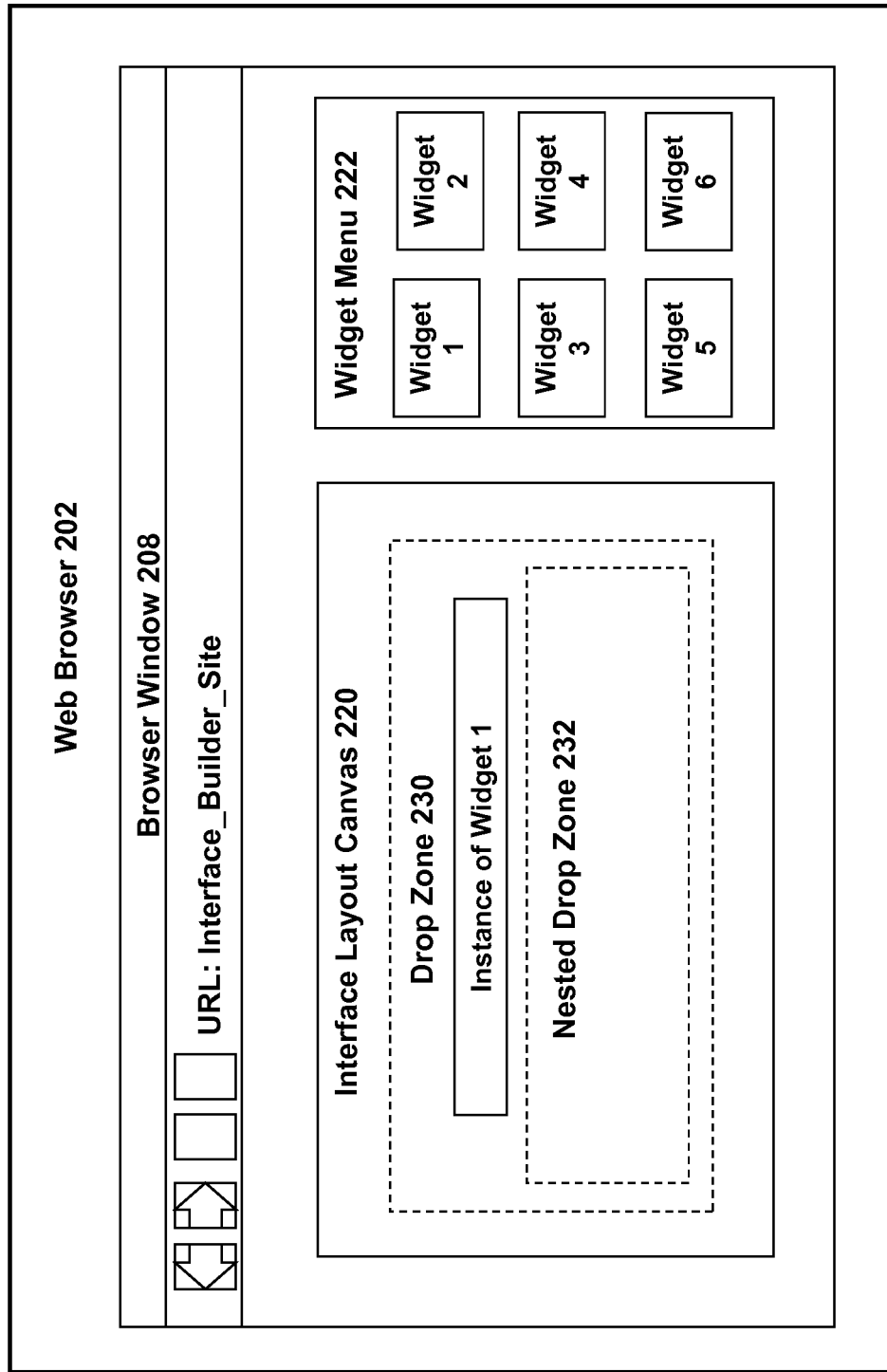

For example, assume that widget 3 has the functionality of providing a drop zone. As shown in FIG. 2D, widget 3 can be dragged from menu 222 and dropped within drop zone 230. With reference to FIG. 2E, this creates a new drop zone 232 that is nested within drop zone 230.

Figure 2G:
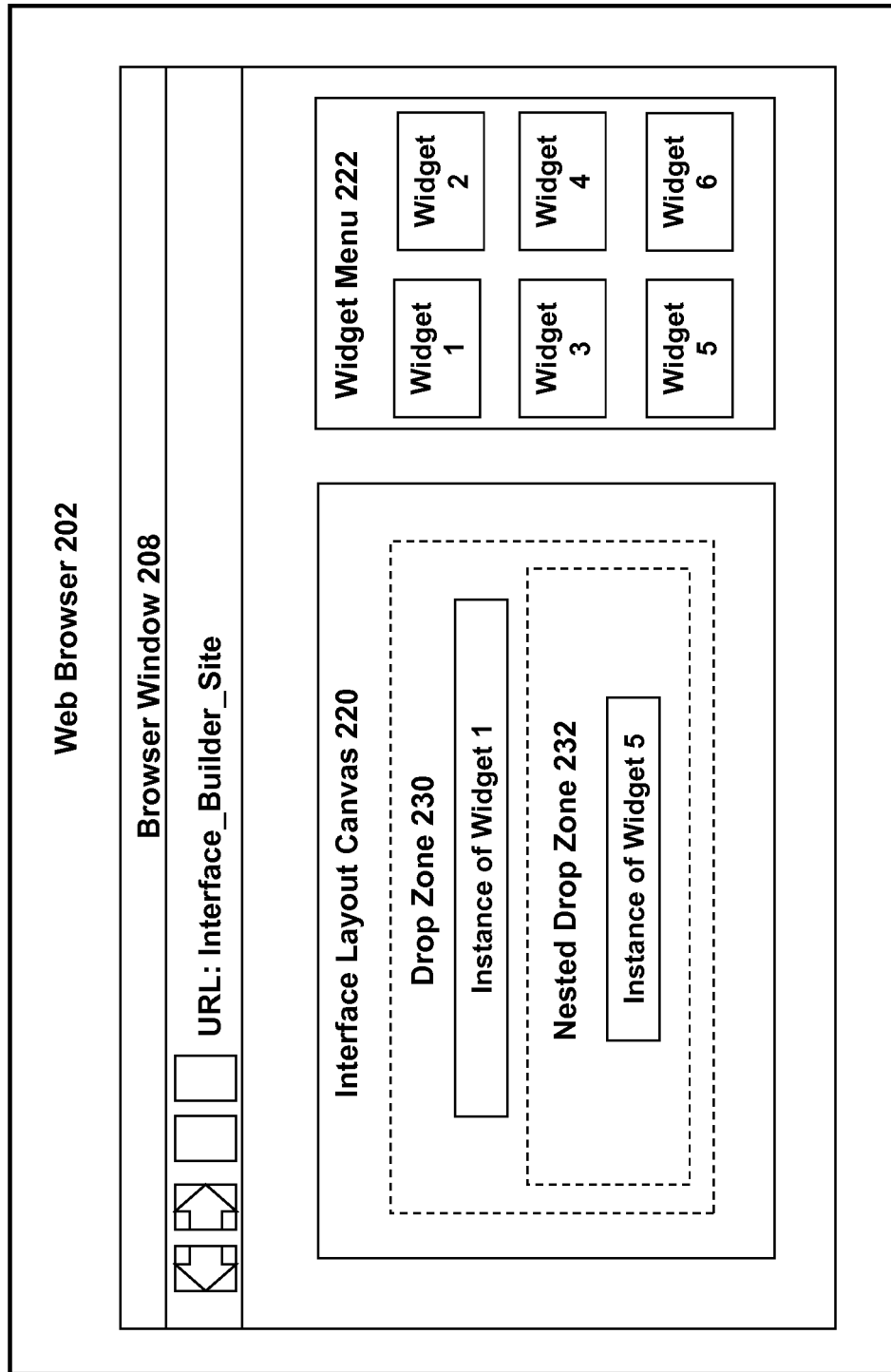

Nested drop zone 232 is a full-fledged widget that allows for other widgets to be dragged and dropped into it. Therefore, as shown in FIG. 2F, another widget 5 can be selected from widget menu 222 and dropped into nested drop zone 232. As shown in FIG. 2G, this results in a new instance of widget 5 now appearing within the interface layout canvas 220 at the location within the nested drop zone 232 at which it was dropped.

The nest drop zones can be configured to implement any suitable layout configuration. For example, a widget can be provided that implements multi-column nested drop zones, where the drop zone provides two or more columns that are available for widgets.

Figure 3A:
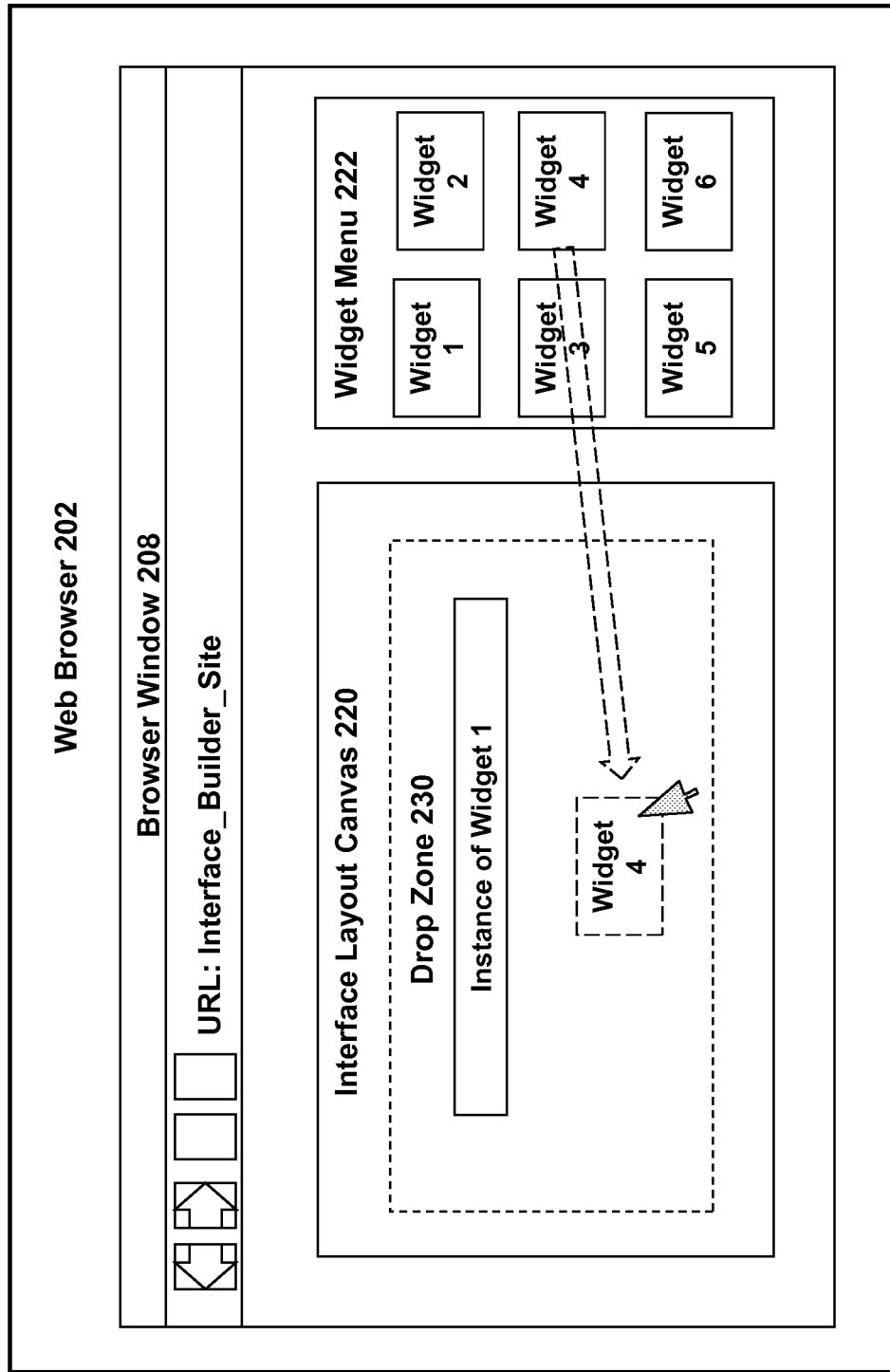
FIGS. 3A-E provide an illustrative example for using an interactive builder application to construct a page layout having a nested drop zone, where the nested drop zone is a multi-column drop zone.
Figure 3B:
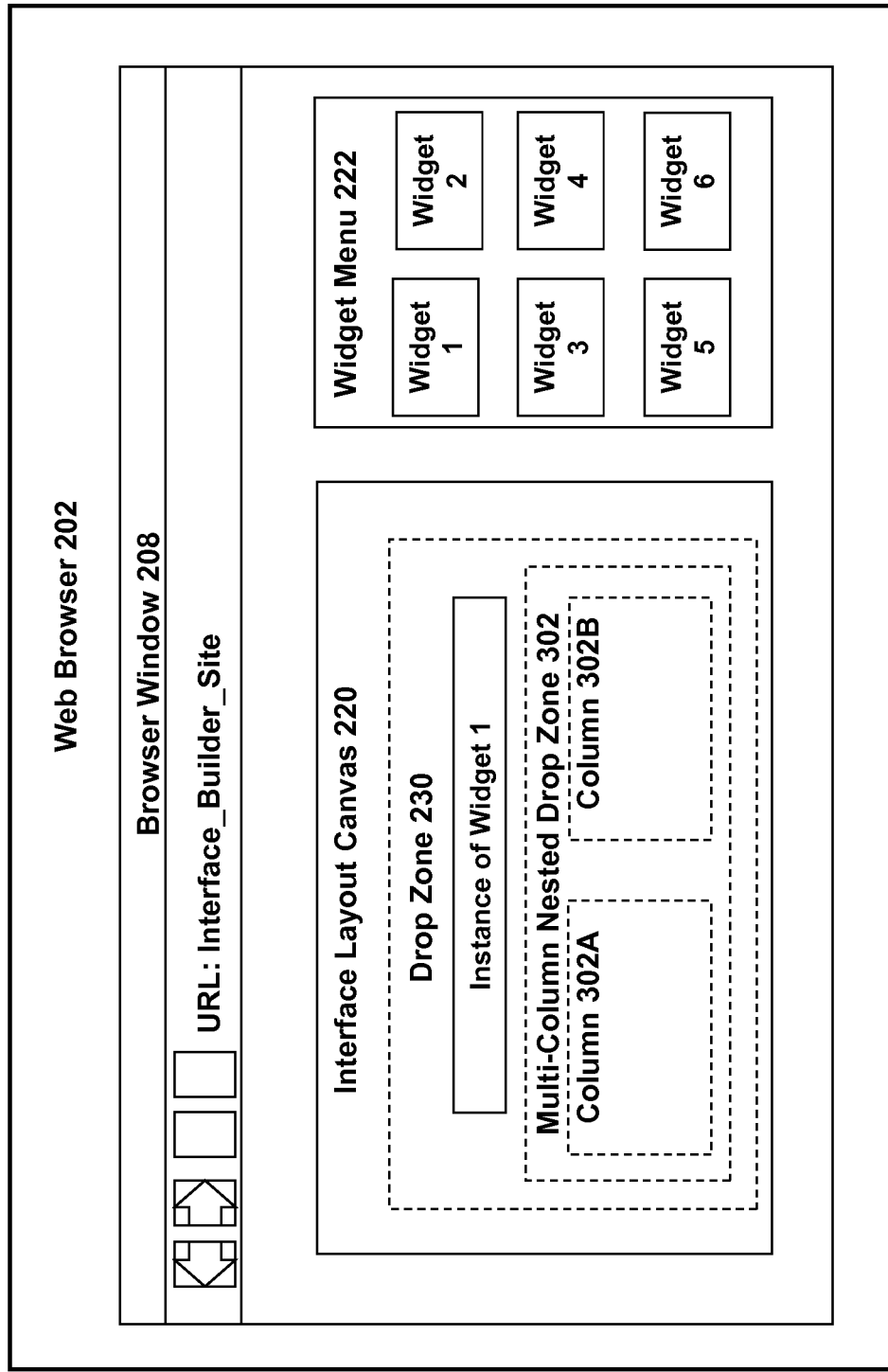

FIGS. 3A-E provide an illustration of this aspect of the invention according to some embodiments. Assume that widget 4 provides functional content to implement a multi-column nested drop zone. Further assume that, as shown in FIG. 3A, the user selects the icon for widget 4 from the widget menu 222, drags it to the interface layout canvas 220, and drops it into the existing drop zone 230. As shown in FIG. 3B, this creates a multi-column nested drop zone 302.

Figure 3C:
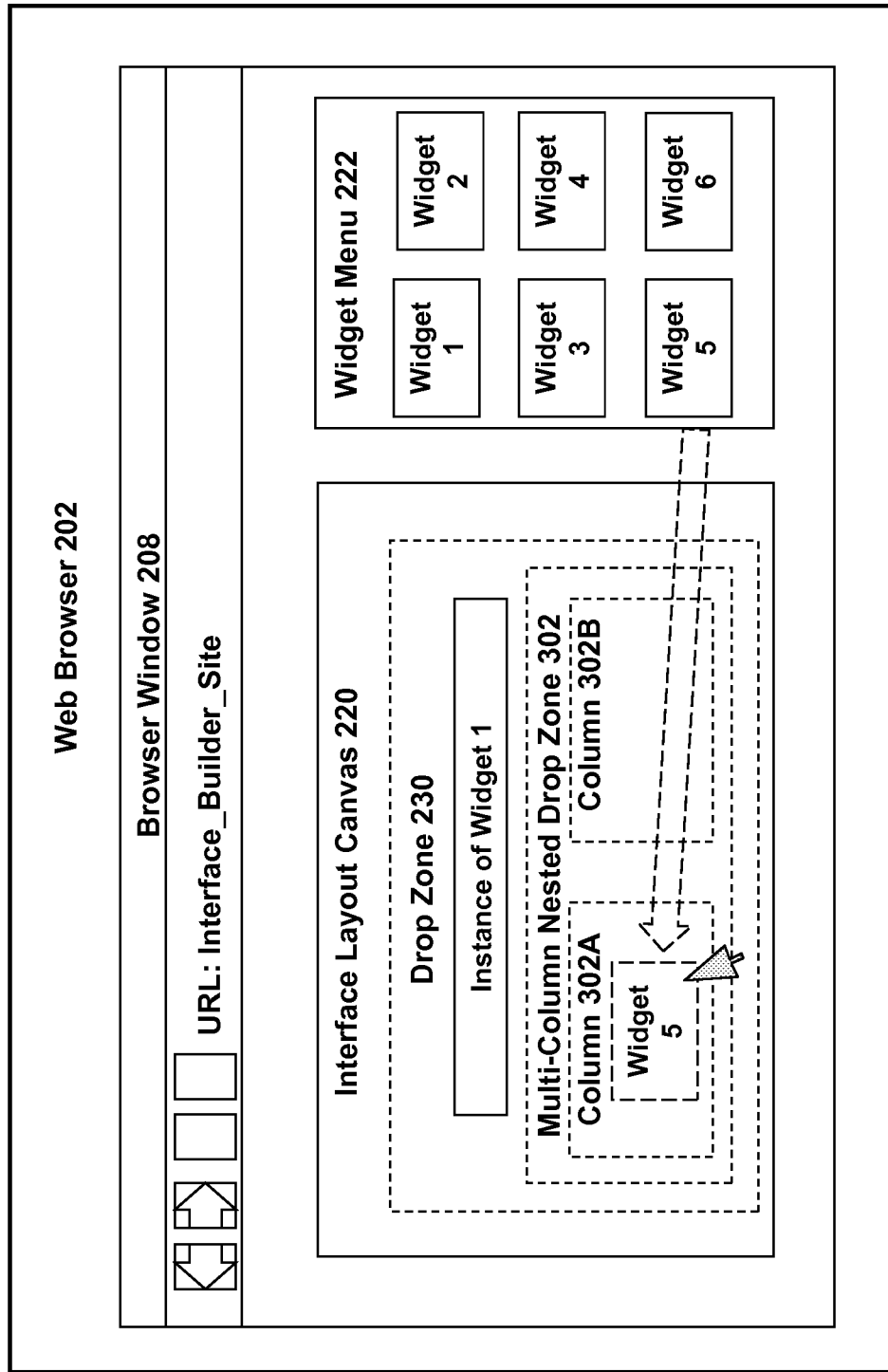
Figure 3D:
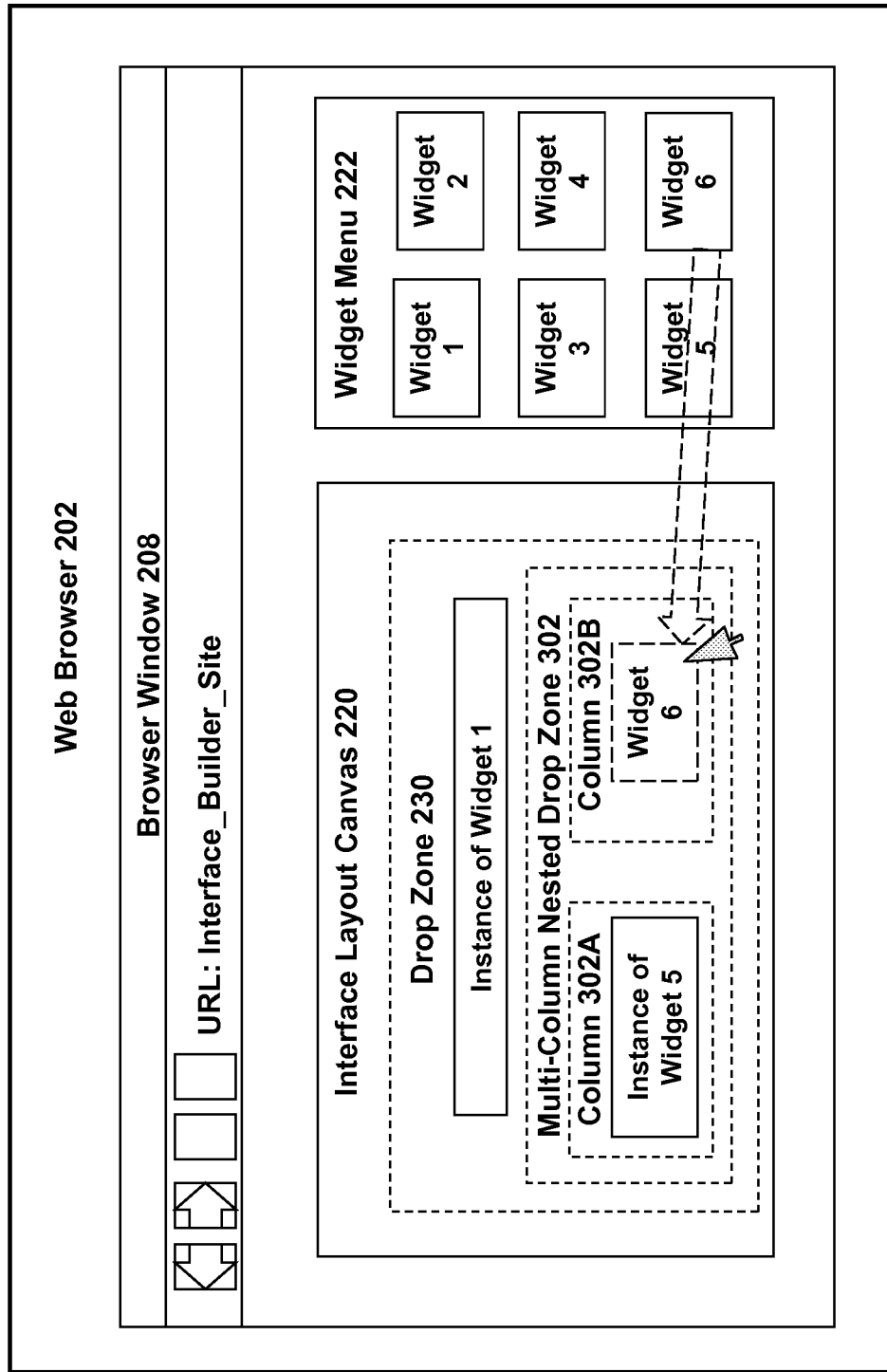
Figure 3E:
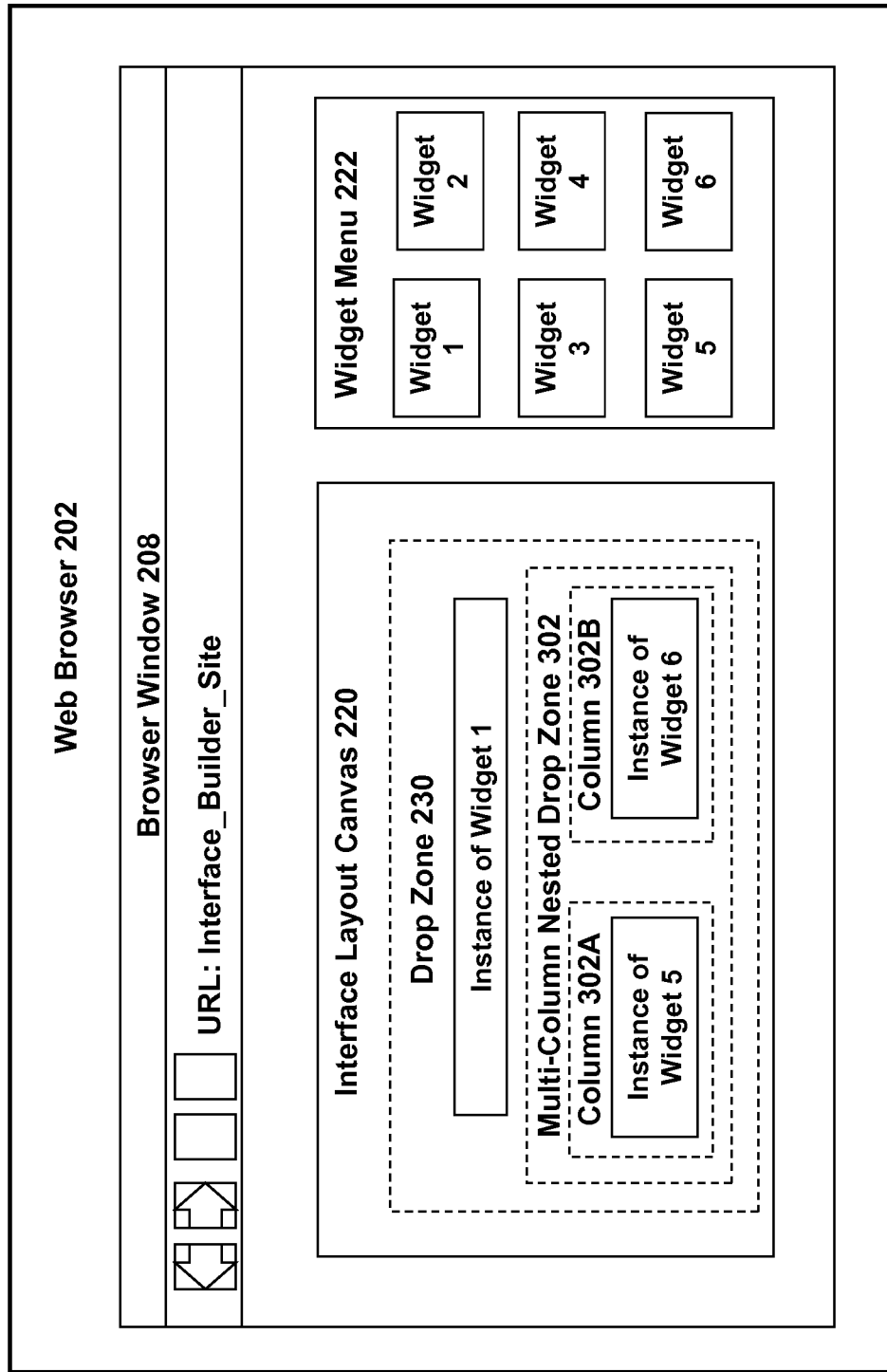

The multi-column nested drop zone 302 includes multiple columns, including column 302A and 302B. Each of these columns 302A and 302B within multi-column nested drop zone 302 are available locations for placement of additional widgets. For example, as shown in FIG. 3C, widget 5 can be dragged and dropped into column 302A of the multi-column nested drop zone 302. Similarly, as shown in FIG. 3D, widget 6 can be dragged and dropped into column 302B of the multi-column nested drop zone 302. As shown in FIG. 3E, this creates an instance of widget 5 in column 302A and an instance of widget 6 in column 302B.

Figure 4:
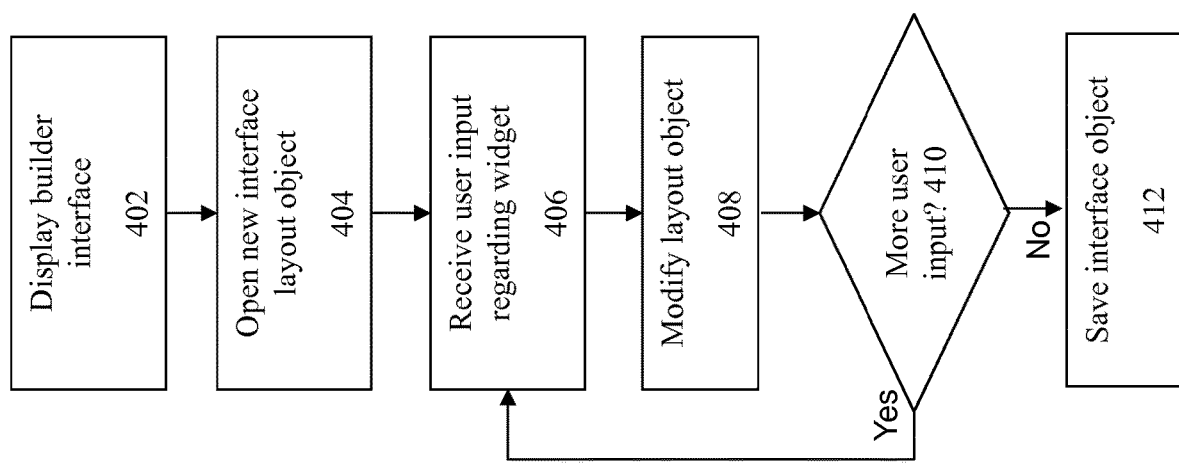
FIG. 4 shows a flowchart of an approach to construct a page layout having a nested drop zone.

FIG. 4 shows a flowchart of an approach for implementing nested drop zones. At 402, the builder interface is displayed to the user. The builder interface may include a graphical user interface for allowing the user to interactively and visually construct a web page and/or application interface. In some embodiment, the builder interface will include a layout canvas for interactive placement of widgets and other content. The builder interface also includes a set of one or more widgets for placement into the layout canvas, where at least one of the available widgets is a drop zone that can be nested within another drop zone.

At 404, a new interface layout object is opened. The layout object corresponds to the new interface that is being constructed by the user using the builder interface. Any suitable data structure may be used to implement the layout object and its constituent features. In one embodiment, a tree structure is maintained to implement the layout object, where nodes in the tree correspond to the features in the layout. In an alternate embodiment, a directed graph (e.g., cyclic or an acyclic) may be used to implement the layout object, where the specific requirements and limitations of the interface determining whether the cyclic and/or acyclic version of the directed graph would be appropriate.

At 406, user inputs are received regarding insertion of widgets into the layout. This action is performed, for example, by detecting that the user has dragged and dropped a widget from a widget menu into the layout canvas.

The user may also provide configuration settings for the newly added widget. For example, assume that the widget has functionality for displaying an image. Once the image display widget has been dropped into the drop zone, the widget can be configured to identify the image to be displayed, e.g., by providing an URL or other storage location for the image. In addition, and as described in more detail below, the newly added widget may be automatically configured by identifying context information for the widget from its parent widget/drop zone.

At 408, the layout object is modified in correspondence to the user action of inserting the new widget. If a tree structure is being used to implement the layout structure, then the tree is modified to include a new node corresponding to the newly inserted widget.

A determination is made at 410 whether additional user inputs will be received to configure the layout. If so, then the process returns back to 406. If not, then the interface object is saved at 412.

Figure 5:
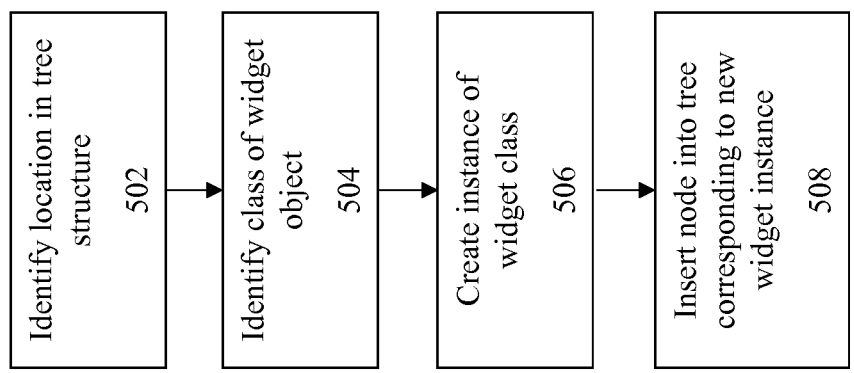
FIG. 5 shows a flowchart of an approach to use a tree data structure to construct a page layout having a nested drop zone.

FIG. 5 shows a more detailed flowchart of an approach according to some embodiments for using a tree-based structure to implement a layout object. The tree comprises a set of one or more nodes, where the nodes correspond to each of the features/widgets in the layout. Each level of the tree corresponds to a given hierarchical level of the layout. Therefore, a higher level feature or drop zone in the layout will have a higher level in the tree structure. As such, a parent drop zone will be at a higher level of the tree structure as compared to its nested drop zone, which will appear at a lower level of the tree structure.

The flow of FIG. 5 pertains to the situation where a new widget is inserted into the canvas for the layout. Thus, at 502, identification is made of the location in the tree structure at which the node for the new widget is to be inserted. For the base drop-zone of the layout, this location is the root location of the tree. For any other widget to be inserted into the layout, the corresponding location in the tree structure is the location in the tree that branches from its direct-parent drop zone.

At 504, the widget class is identified for the widget that is being added into the layout. Each widget is associated with a particular widget class, and includes general and/or default functionality/configurations based upon the master copy of the code for that class of widget objects.

The newly added widget is a new instance of its widget class. Therefore, at 506, a new instance identifier is created for the newly inserted widget. The identifier permits unique identification and distinguishing of the widget from other widgets of the same class. In some cases, the new instance identifier is a number that is created by incrementing from the last issued instance number for that same class of widget objects. In other cases, the same instance may be inserted into multiple places within the layout, and hence may correspond to the same instance number, e.g., where the exact same widget coupon is to be placed at multiple places within the same layout.

At 508, the node associated with the new widget is inserted into the appropriate location in the tree structure. The node will include and/or point to information about the widget, including the instance identifier for the widget. In addition, the node will include and/or point to configuration information for the widget.

FIGS. 6A-6D illustrate how a tree structure can be used to configure a layout for the insertion of widgets/features, with this illustrative example tracking the example from FIGS. 2A-2G. The interface canvas 220 is shown in the upper left portion of the figures. The upper right portion of the figures contains the tree structure 600 as it is built over time. The bottom portion of the figures includes a table 620 that provides the details for each widget and its corresponding node in the tree 600.

FIG. 6A illustrates creation of the layout having the main drop zone widget 230 for the layout 220. As the main drop zone 230 for the layout, this corresponds to the root node 602 for the tree. At this point, no other widgets/features have been added to the layout, i.e., no other widgets have yet been dragged and dropped into drop zone 230. Therefore, tree 600 only includes a single node 602 corresponding to the main drop zone 230.

Figure 6B:
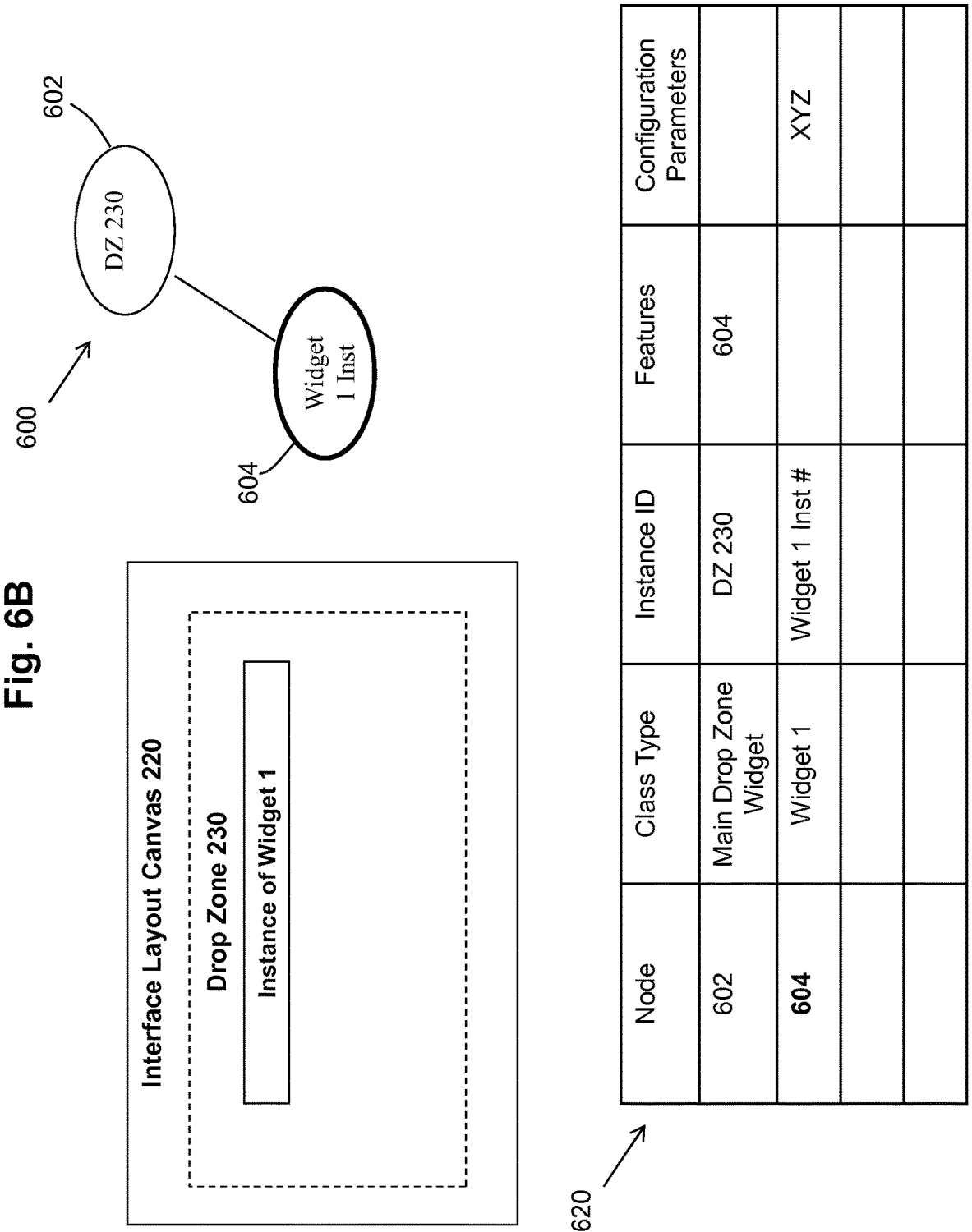

FIG. 6B illustrates the situation where the user has used the user interface to drag and drop the icon for widget 1 into the drop zone 230. This creates a layout 220 where drop zone 230 now includes an instance of widget 1. Logically, since drop zone 230 is the parent of the new instance widget 1, this means that the newly added instance of widget 1 is a "feature" of drop zone 230. The tree structure 600 is modified to include a new node 604 to correspond to the new instance of widget 1.

FIG. 6C illustrates the situation where a drop zone widget is inserted into the existing drop zone 230, creating a nested drop zone 232. Since drop zone 230 is the parent of the new nested drop zone 232, this means that the newly added nested drop zone 232 is a feature of drop zone 230, very similar to the feature 604 that also exists for base node 602. Therefore, tree structure 600 is modified to include a new node 606 to correspond to the new nested drop zone 232.

Since nodes 604 and 606 are both direct children features from base node 602, both are at the same hierarchical level within tree structure 600. However, it is assumed that node 604 pertains to a widget that does not provide drop zone functionality. Therefore, node 604 is a terminal leaf node in the tree structure 600. In contrast, node 606 corresponds to nested drop zone 232, and hence it is possible that additional one or more widgets will be dropped into this drop zone 232. As such, it is possible for node 606 to be converted into an internal node within the tree structure if one or more additional features are added to the drop zone 232.

Figure 6D:
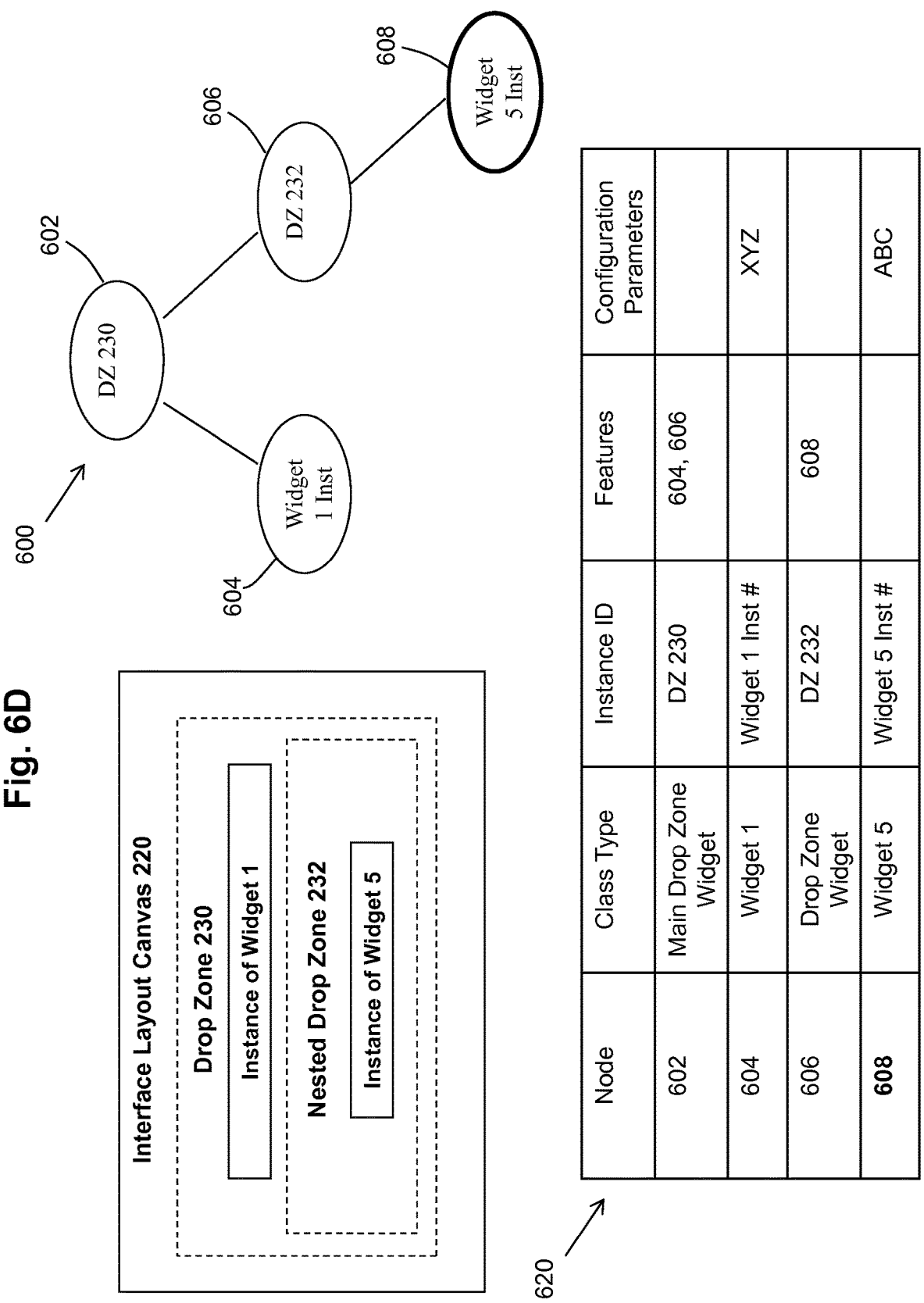

FIG. 6D illustrates the situation where the user uses the user interface to drag and drop the icon for widget 5 into the nested drop zone 232. This creates a layout 220 where nested drop zone 230 now includes its own feature—an instance of widget 5. Therefore, the tree structure 600 is modified to include a new node 608 corresponding to the new instance of widget 5, where the new node 608 is a child node from its parent node 606.

Figure 7:
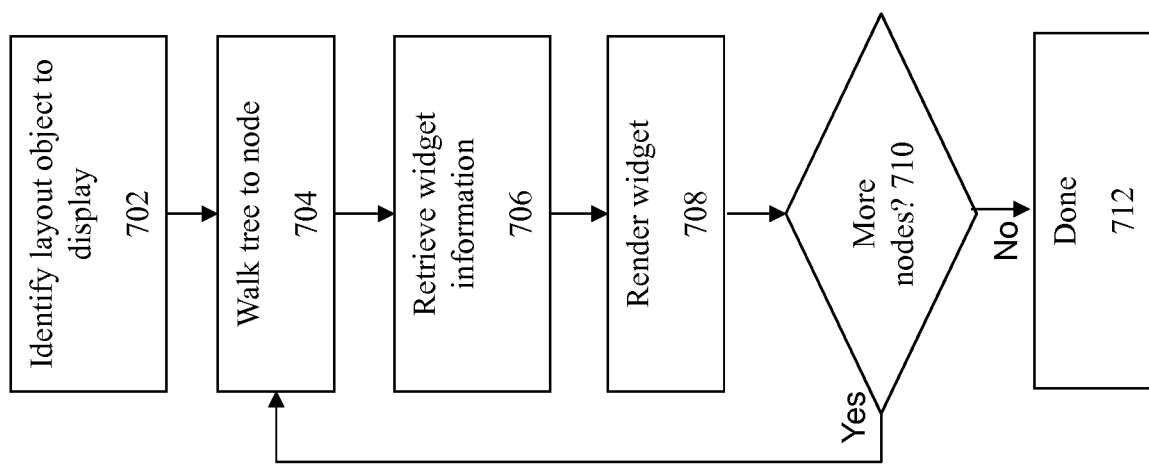
FIG. 7 shows a flowchart of an approach to render a page layout having a nested drop zone.

FIG. 7 shows a flowchart of an approach for displaying the new web page/interface that has been constructed using the above-described approach. At 702, identification is made of the layout object to be displayed. This action identifies the specific object/structure that has been constructed having the features and configuration for the layout.

Assuming that a tree structure was used to implement the layout, then at 704, the process walks the tree to arrive at a node within the tree. In some embodiments, the tree structure is walked in a left-to-right depth-first order, starting with the root node and proceeding through the rest of the nodes in the tree.

At 706, widget information associated with the node is retrieved. If the widget information is directly stored in the node, then the widget information is retrieved from the node itself. If the widget information is stored elsewhere, then the identified location for the information is accessed to retrieve the necessary data. For example, the widget may identify an external URL location that includes content to be displayed by the widget, which is accessed to obtain the data to be displayed in the widget.

At 708, the widget is rendered for display in the user interface. To explain, consider if the user interface is a web browser. If the widget comprises content that is directly displayable by the browser (e.g., HTML), then the widget content is directly retrieved for display in the browser window. If, however, the widget comprises content that is not directly displayable by the web browser (e.g., functional content in a specialized programming language such as SML ("social markup language")), then a translator module or plug-in employed to convert the content into a format (e.g., HTML) that is displayable by the browser.

At 710, a determination is made whether there are additional nodes in the tree to be processed. If so, then the process returns back to 704 to walk the tree to the next node. If not, then the process ends at 712.

This disclosure will now describe an improved approach to provide configuration information to a widget. In certain embodiments of the invention, a "contextual" widget is provided where the widget obtains some or all of its configuration information in the context of another widget. This creates a dependency between the contextual widget and another widget, so that it obtains its context from another widget.

This approach provides certain advantages over conventional approaches to implementing widgets, where each widget is normally self-contained and independent of other widgets. For widgets in which it is desired to have behavior depend from another widget, the present approach permits a very efficient way to create those dependencies.

Figure 8:
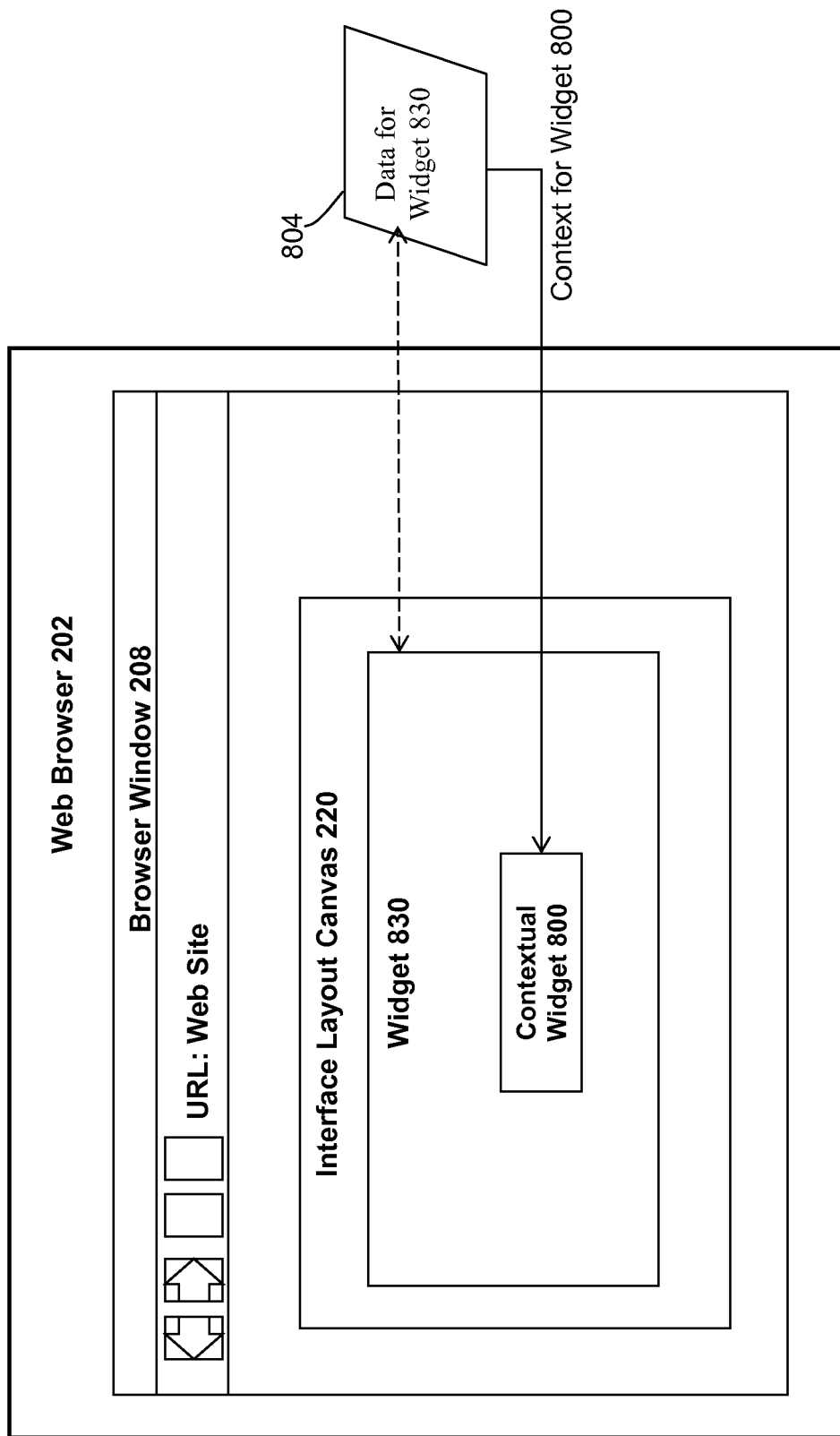
FIG. 8 provides an illustrative example of a contextual widget.

FIG. 8 provides an illustrative example of a contextual widget. This figure shows a widget 830 that is associated with corresponding data 804. There is a second widget 800 in the interface layout. The second widget is a contextual widget which gets certain of its contextual information from data 804 for its parent widget 830.

In the preferred embodiment, the widget providing the context data is a widget having a drop zone. The contextual widget is a widget that is placed into the drop zone expecting to receive at least some of its context from its parent drop zone widget. When the contextual widget is placed into the drop zone, the contextual widget will automatically receive some of its context information from being in that drop zone. This approach therefore provides a very efficient approach to implement and customize a first instance of a widget, such that it acts differently from any other instance of that same widget, merely by dropping that widget into a given drop zone.

FIG. 9 shows pseudo code 902 for an example widget having a drop zone that provides context to another widget. This pseudo code 902 includes a portion 904 that retrieves stories from a RSS feed, looping through to obtain five news stories from the RSS feed. Portion 906 indicates that the drop zone within the widget provides the story content as the context for a widget that is dropped into that drop zone.

FIG. 10 shows a flowchart of an approach to implement contextual widgets according to some embodiment of the invention. At 1002, a widget is identified for rendering. At 1004, a determination is made whether the widget is a contextual widget. In some embodiment, this determination is made by identification of certain code within the widget codebase that seeks to obtain some or all of its context from another widget, e.g., its parent drop zone widget.

If the widget is a contextual widget, then at 1006, the system performs actions to retrieve the context data from the parent widget. For example, assume that the contextual widget performs the function of displaying an image, where the image is supposed to be from the parent drop zone. In this situation, an attempt is made to retrieve the image from the parent widget.

A determination is made at 1010 whether the attempt to retrieve the context data from the parent widget is successful. The retrieval attempt may be unsuccessful, for example, if the requested data from the parent widget does not exist. If the requested data does not exist, then error handling is performed at 1016. If the data retrieval is successful, then at 1014, the retrieved data is used to render the contextual widget.

FIG. 11 provides an illustrative example of this embodiment of the invention. This figure shows pseudo code 1102 for an example contextual widget that obtains at least some of its context from a parent drop zone widget. The pseudo code 1102 includes a portion 1104 that checks whether the parent widget has the requested data. If not, error handling is performed.

In addition, the pseudo code 1102 includes a portion 1106 that retrieves data from the parent drop zones to populate context data in the contextual widget. To the extent the drop zone has a context image, context video, and/or a context description, then those data items from the drop zone will be used as the image for the contextual widget.

FIG. 12 shows an illustrative example of an interface that includes a contextual widget corresponding to the pseudo code 1102 of FIG. 11. Here, a contextual widget 1100 has been dropped into a drop zone 1130. The contextual widget is, for example, a "Like Button" widget that seeks a context image from its parent drop zone. In this case, the parent drop zone widget does indeed have a context image 1132. The context image 1132 for the drop zone 1130 is therefore provided to the contextual widget 1100 to be displayed as the widget's image.

Therefore, what has been described is an improved for visually implementing a web page layout, where the web page layout includes a nested drop zone. Allowing the user to interactively implement nested drop zones provides numerous benefits, including the benefit of being able to create specialized layout configurations for a web page without requiring the need for expert programmers to write computer code for the new configuration. This permits the user to implement highly customized layout in a very easy and efficient way.

In addition, an improved approach has been described to implement a new type of widget that obtains its context information from another widget. For example, when a contextual widget is dropped into a drop zone, that contextual widget would obtain its context data from its parent drop zone widget.

System Architecture Overview

Figure 13:
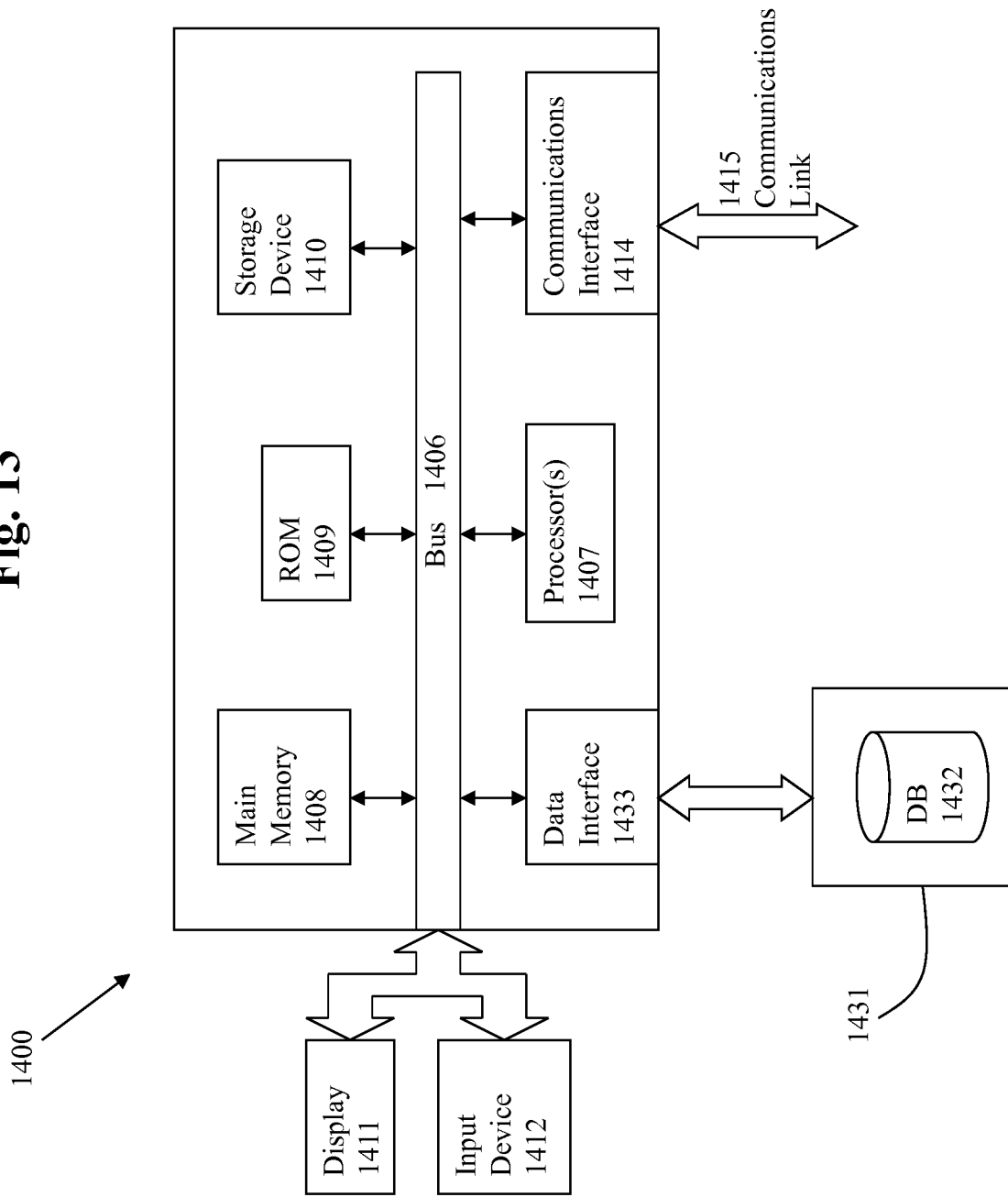
FIG. 13 illustrates a flowchart of an approach for selecting a replacement application according to some embodiments of the invention.

FIG. 13 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method implemented with a processor, comprising:
   displaying, by an interface builder for building an interface, a main drop zone for dropping widgets, the widgets comprising at least one of: an application or functional content to be embedded in the interface;
   detecting user input dragging and dropping a first drop zone widget into the main drop zone to generate a first nested drop zone, corresponding to an instance of the first drop zone widget, in the main drop zone;
   displaying, by the interface builder, the first nested drop zone within the main drop zone;
   detecting user input dragging and dropping a second widget into the first nested drop zone to generate a first contextual widget comprising code to obtain context data from any compatible parent widget in which the first contextual widget is nested;
   responsive to determining that the first contextual widget is nested in the instance of the first drop zone widget, retrieving a first context data from the instance of the first drop zone widget;
   rendering the first contextual widget including a first software functionality corresponding to the application or functional content of the first contextual widget being based at least in part on the retrieved first context data;
   detecting user input dragging and dropping a second drop zone widget into the main drop zone to generate a second nested drop zone, corresponding to an instance of the second drop zone widget, in the main drop zone;
   displaying, by the interface builder, the second nested drop zone within the main drop zone;
   detecting user input dragging and dropping the second widget into the second nested drop zone to generate a second contextual widget comprising code to obtain context data from any compatible parent widget in which the second contextual widget is nested;
   responsive to determining that the second contextual widget is nested in the instance of the second drop zone widget, retrieving a second context data from the instance of the second drop zone widget; and
   rendering the second contextual widget including a second software functionality corresponding to the application or functional content of the second contextual widget being based at least in part on the retrieved second context data, wherein the second software functionality is different than the first software functionality.

2. The method of claim 1, further comprising:
   performing error handling with the code in the first contextual widget based on determining that the first context data is not available.

3. The method of claim 1, wherein the first contextual widget comprises a drop zone in which to nest another widget.

4. The method of claim 1, wherein the first drop zone widget supplies the first context data to a plurality of first contextual widgets nested in the first drop zone widget.

5. The method of claim 1, wherein the first context data comprises at least one of an image, a video, or a content description that is displayed when the first contextual widget is rendered.

6. The method of claim 1, wherein the first drop zone widget comprises a multi-column drop zone widget, such that the first nested drop zone comprises a plurality of columns, and wherein detecting user input dragging and dropping the contextual widget into the first nested drop zone comprises detecting user input dragging and dropping the first contextual widget into a particular column of the plurality of columns of the first nested drop zone.

7. The method of claim 6, wherein displaying the first nested drop zone within the main drop zone comprises displaying the plurality of columns of the first nested drop zone.

8. A computer program product embodied on a non-transitory computer usable medium, the non-transitory computer readable medium having stored thereon a sequence of instructions which, when executed by a processor causes the processor to execute a set of acts for implementing a contextual widget, the set of acts comprising:
   displaying, by an interface builder for building an interface, a main drop zone for dropping widgets, the widgets comprising at least one of: an application or functional content to be embedded in the interface;
   detecting user input dragging and dropping a first drop zone widget into the main drop zone to generate a first nested drop zone, corresponding to an instance of the first drop zone widget, in the main drop zone;
   displaying, by the interface builder, the first nested drop zone within the main drop zone;
   detecting user input dragging and dropping a second widget into the first nested drop zone to generate a first contextual widget comprising code to obtain context data from any compatible parent widget in which the first contextual widget is nested;
   responsive to determining that the first contextual widget is nested in the instance of the first drop zone widget, retrieving a first context data from the instance of the first drop zone widget; and
   rendering the first contextual widget including a first software functionality corresponding to the application or functional content of the first contextual widget being based at least in part on the retrieved first context data;

detecting user input dragging and dropping a second drop zone widget into the main drop zone to generate a second nested drop zone, corresponding to an instance of the second drop zone widget, in the main drop zone;

displaying, by the interface builder, the second nested drop zone within the main drop zone;

detecting user input dragging and dropping the second widget into the second nested drop zone to generate a second contextual widget comprising code to obtain context data from any compatible parent widget in which the second contextual widget is nested;

responsive to determining that the second contextual widget is nested in the instance of the second drop zone widget, retrieving a second context data from the instance of the second drop zone widget; and rendering the second contextual widget including a second software functionality corresponding to the application or functional content of the second contextual widget being based at least in part on the retrieved second context data, wherein the second software functionality is different than the first software functionality.

9. The computer program product of claim 8, wherein the instance of the first drop zone widget is nested into another widget.

10. The computer program product of claim 9, wherein the first contextual widget comprises a drop zone in which to nest another widget.

11. The computer program product of claim 8, wherein the instance of the first drop zone widget is a parent to the first contextual widget in a tree data structure representing a rendering layout.

12. The computer program product of claim 8, wherein the instance of the first drop zone widget supplies context data for a plurality of contextual widgets nested in the instance of the first drop zone widget.

13. The computer program product of claim 8, further comprising:
performing error checking to check whether the instance of the first drop zone widget is able to provide context data for the first contextual widget.

14. A system for implementing a contextual widget, comprising:
a processor;
a memory comprising computer code executed using the processor, in which the computer code, when executed by the processor, causes the processor at least to:
display, by an interface builder for building an interface, a main drop zone for dropping widgets, the widgets comprising at least one of: an application or functional content to be embedded in the interface;
detect user input dragging and dropping a first drop zone widget into the main drop zone to generate a first nested drop zone, corresponding to an instance of the first drop zone widget, in the main drop zone;
display, by the interface builder, the first nested drop zone within the main drop zone;
detect user input dragging and dropping a second widget into the first nested drop zone to generate a first contextual widget comprising code to obtain context data from any compatible parent widget in which the first contextual widget is nested;
responsive to determining that the first contextual widget is nested in the instance of the first drop zone widget, retrieve a first context data from the instance of the first drop zone widget;
render the first contextual widget including a first software functionality corresponding to the application or functional content of the first contextual widget being based at least in part on the retrieved first context data;
detect user input dragging and dropping a second drop zone widget into the main drop zone to generate a second nested drop zone, corresponding to an instance of the second drop zone widget, in the main drop zone;
display, by the interface builder, the second nested drop zone within the main drop zone;
detect user input dragging and dropping the second widget into the second nested drop zone to generate a second contextual widget comprising code to obtain context data from any compatible parent widget in which the second contextual widget is nested;
responsive to determining that the second contextual widget is nested in the instance of the second drop zone widget, retrieve a second context data from the instance of the second drop zone widget; and
render the second contextual widget including a second software functionality corresponding to the application or functional content of the second contextual widget being based at least in part on the retrieved second context data, wherein the second software functionality is different than the first software functionality.

15. The system of claim 14, wherein the instance of the first contextual widget comprises a drop zone in which another widget is nested.

16. The system of claim 14, wherein the instance of the first drop zone widget is a parent to the first contextual widget in a tree data structure representing a rendering layout.

17. The system of claim 14, wherein the instance of the first drop zone widget supplies context data for a plurality of contextual widgets nested in the instance of the first drop zone widget.

18. The system of claim 14, wherein the computer code further causes the processor to perform error checking to check whether the instance of the first drop zone widget is able to provide context data for the first contextual widget.

* * * * *